(12) United States Patent
Hickey

(10) Patent No.: US 8,801,004 B2
(45) Date of Patent: Aug. 12, 2014

(54) ROLLING STORAGE CART FOR AN ARTIFICIAL CHRISTMAS TREE

(75) Inventor: David R. Hickey, Darien, IL (US)

(73) Assignee: Cross Tread Industries, Inc., Willow Springs, IL (US)

( * ) Notice: Subject to any disclaimer, the term of this patent is extended or adjusted under 35 U.S.C. 154(b) by 173 days.

(21) Appl. No.: 13/200,619

(22) Filed: Sep. 27, 2011

(65) Prior Publication Data

US 2012/0112425 A1    May 10, 2012

Related U.S. Application Data

(60) Provisional application No. 61/404,076, filed on Sep. 27, 2010.

(51) Int. Cl.
  *B62B 1/00*    (2006.01)
(52) U.S. Cl.
  USPC ...................................... 280/47.19; 280/79.3
(58) Field of Classification Search
  USPC ............. 280/47.19, 47.26, 47.24, 47.29, 652, 280/79.11, 79.4, 79.7; D34/12–26; 414/23, 414/453, 454, 490; 29/428; 53/530, 390, 53/588; 47/20–21
  See application file for complete search history.

(56) References Cited

U.S. PATENT DOCUMENTS

| | | | | | |
|---|---|---|---|---|---|
| 5,070,678 | A | * | 12/1991 | Morrill | 53/459 |
| 5,320,323 | A | * | 6/1994 | Clark, Jr. | 248/523 |
| 5,685,518 | A | * | 11/1997 | Fox et al. | 248/523 |
| 6,260,335 | B1 | * | 7/2001 | Helinski | 53/530 |
| 6,481,694 | B2 | * | 11/2002 | Kozak | 254/325 |
| 6,983,921 | B1 | * | 1/2006 | Rahmer | 248/523 |
| 2005/0082244 | A1 | * | 4/2005 | Ho | 211/85.23 |
| 2009/0184073 | A1 | * | 7/2009 | Lu | 211/85.3 |
| 2012/0007343 | A1 | * | 1/2012 | Webster et al. | 280/659 |

* cited by examiner

*Primary Examiner* — John Walters
*Assistant Examiner* — James Triggs
(74) *Attorney, Agent, or Firm* — Pyle & Piontek, LLC

(57) ABSTRACT

A rolling storage cart for movement and storage of multiple parts of an artificial Christmas tree is disclosed. The cart has a wheeled base supporting an upright section having a plurality of holding means, such as arms with forks or clamps, thereon to which dismantled parts or sections of the artificial Christmas tree are engageable for movement to an out of season storage location. The cart can easily be moved and positioned next to the tree during dismantling thereof and for reuse or rebuilding of the tree the following season without causing undue physical burden on the user when the tree is made, for example of metal, has a height of six feet or more, and for has significant weight.

22 Claims, 26 Drawing Sheets

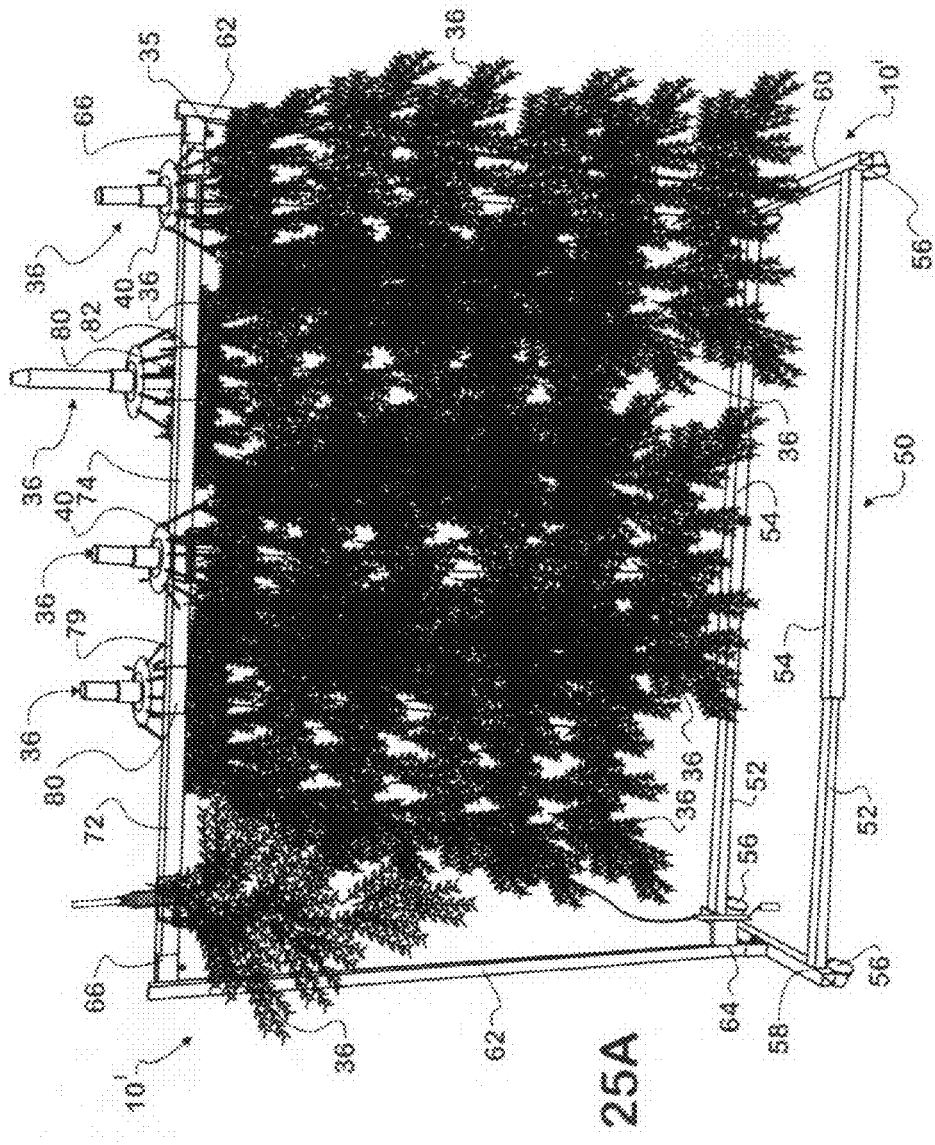

ROLLING STORAGE CART FOR AN ARTIFICIAL CHRISTMAS TREE

DISCLOSURE

This application is a U.S. Non-Provisional application based on U.S. Provisional Application No. 61/404,076, filed Sep. 27, 2010, of which benefit and filing date is claimed and relates to a rolling storage cart for use in storing artificial Christmas tree parts in an organized, moveable manner, so they can be easily placed on the cart, moved to storage, and moved from storage to the tree erection site and taken off the cart to erect the Christmas tree.

BACKGROUND OF THE INVENTION

Artificial Christmas trees are made in parts or sections, and particularly large ones, say six or seven or eight feet tall, or larger, or made all or partially of metal, are heavy and cumbersome to dismantle and store. The parts or sections of the tree cannot be put back or "stuffed" into their original packaging and/or cartons, which have usually been thrown away. "Stuffing" the tree parts or sections into most containers or cartons risks damage to the tree parts. There is no known prior art disclosing the rolling storage cart(s) for artificial Christmas trees as disclosed herein.

As noted above, if the parts are carried from the place the tree is displayed to where it could be stored, such as a garage, this can be a daunting and awkward task, and the parts can be damaged.

SUMMARY OF THE INVENTION

According to the present invention there are provided several embodiments of rolling or wheeled storage carts for storage of an artificial Christmas tree. Each cart comprising a wheeled base supporting an upright or vertical section(s) having a plurality of holding means, such as forks or clamps, thereon to which the dismantled multiple parts or sections of the artificial Christmas tree are engageable for storage out of season. The cart can be easily positioned next to the tree during dismantling thereof, and likewise during erection thereof, for erection or re-erection and reuse of the tree the following season without causing undue physical burden. In this respect, during both dismantling and reconstruction of the heavy artificial Christmas tree, one need only work with a section at a time, with the sections and bottom piece being in close proximity to the area of the tree because the cart rolls on wheels, reducing the burden on the user. Further, the parts are kept in an organized manner of disassembly or assembly so the tree can be easily dismantled or rebuilt.

More particularly, there are disclosed hereinbelow embodiments of such an artificial Christmas tree storage cart, each having structure thereon to which portions of the artificial Christmas tree can be engaged. While the tree is being dismantled, the parts thereof can be suitably engaged onto the cart and then moved, rolled via its wheels, to a location, such as within a garage or storage shed, for storage and can easily be wheeled back to a location where a tree is desired to be placed the following year. The carts are particularly adapted for use in storing large Christmas trees, having significant weight to them and their parts. As will be disclosed in greater detail hereinafter, the cart produces a means by which a large, heavy artificial Christmas tree can be in a dismantled state, stored thereon and moved from place to place, as needed, without placing undue physical burden on the person dismantling or rebuilding the tree.

BRIEF DESCRIPTION OF THE DRAWINGS

FIG. 25A is a perspective view showing the cart of FIG. 24 fully extended in a horizontal direction and having five tree sections engaged thereto via the forks or clamps.

DESCRIPTION OF THE PREFERRED EMBODIMENTS

Figure 1:
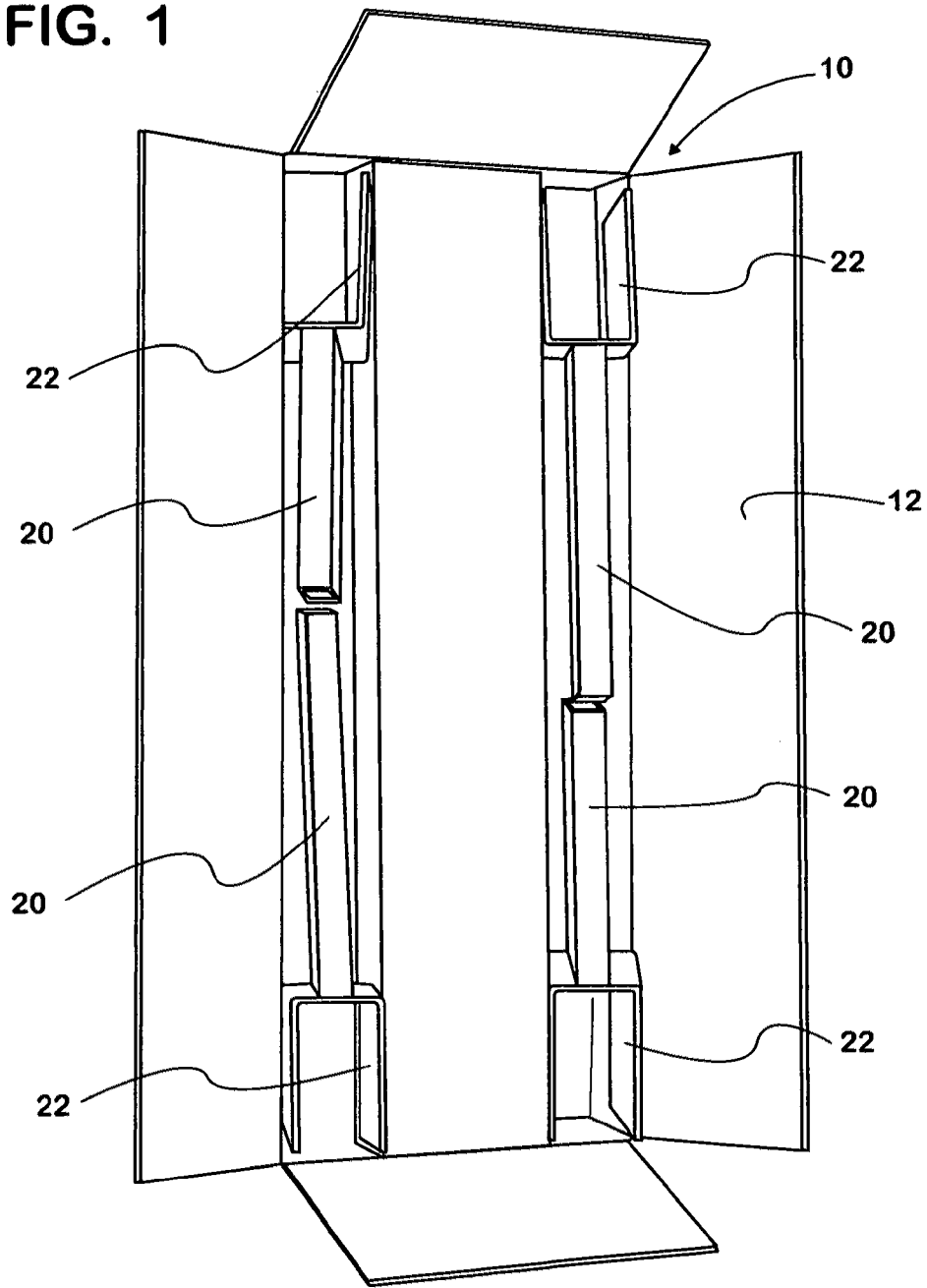
FIG. 1 is a perspective view of a box or shipping carton showing a first embodiment of the rolling storage cart for artificial Christmas tree storage of the present invention completely packed therein.

Referring to the drawings in greater detail, there are illustrated therein two preferred embodiments of the rolling, wheeled cart for storage of an artificial Christmas tree made in accordance with the present invention and generally referred to by the reference numerals 10 (FIGS. 1 to 17) and 10' (FIGS. 18 to 25B).

Figure 2:
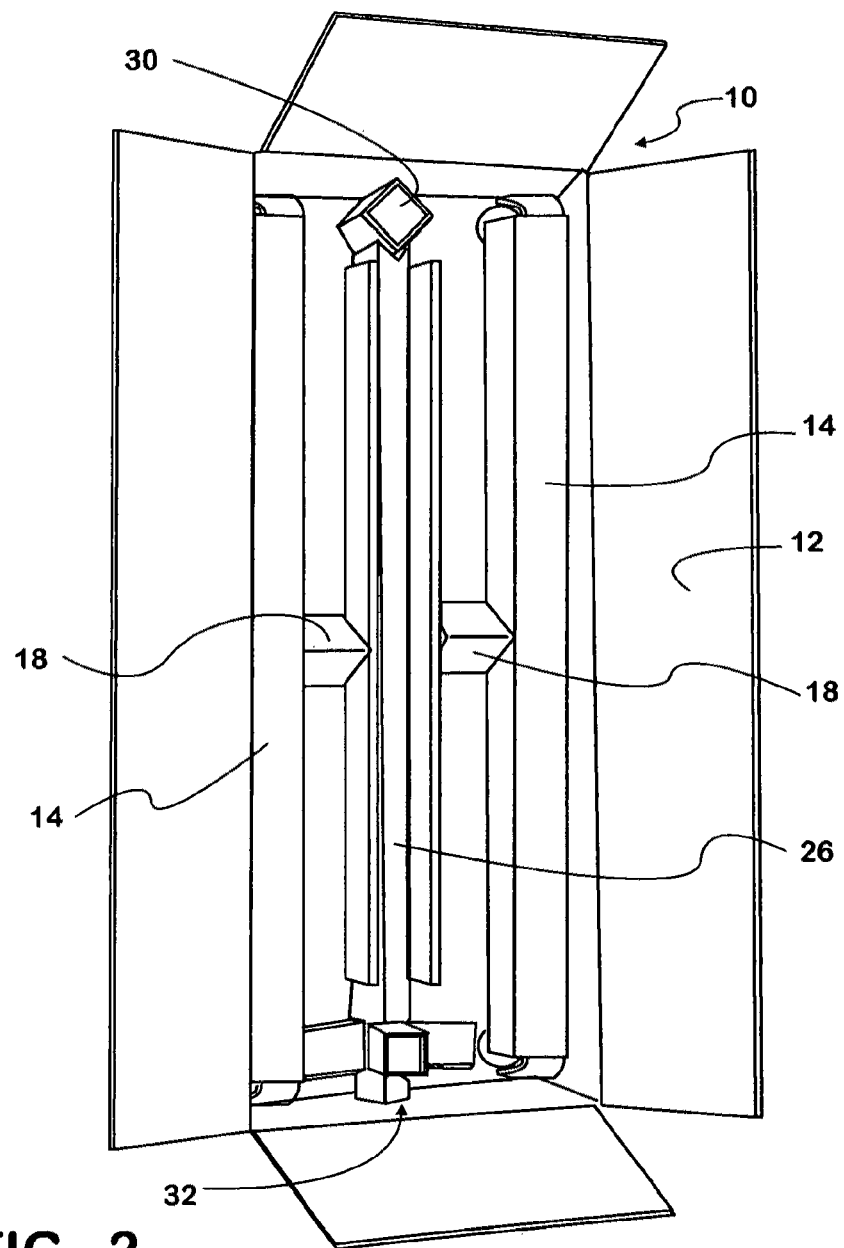
FIG. 2 is similar to FIG. 1 but has a top layer of cart parts therein removed therefrom to show the next layer of parts therebelow.
Figure 3:
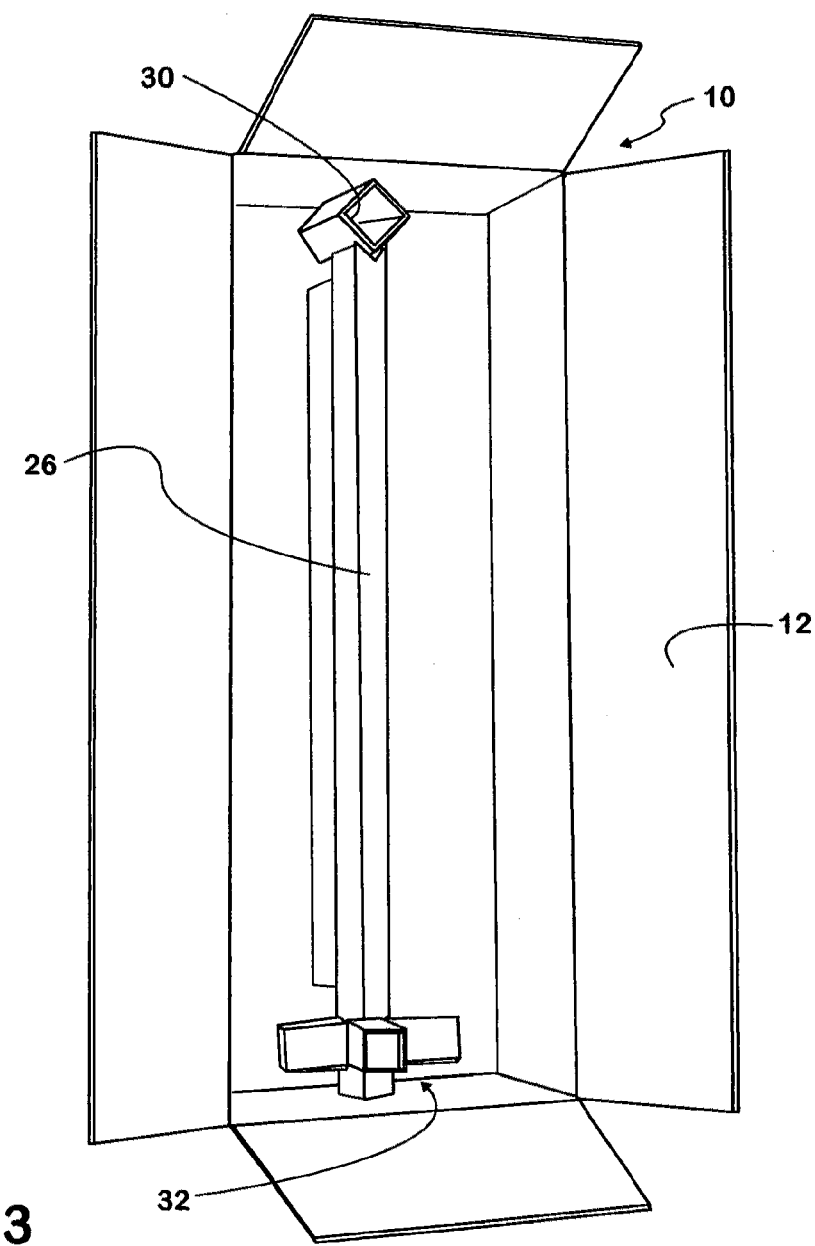
FIG. 3 is similar to FIG. 2 but shows another layer of cart parts therein removed therefrom to show the next layer of parts therebelow.
Figure 4:
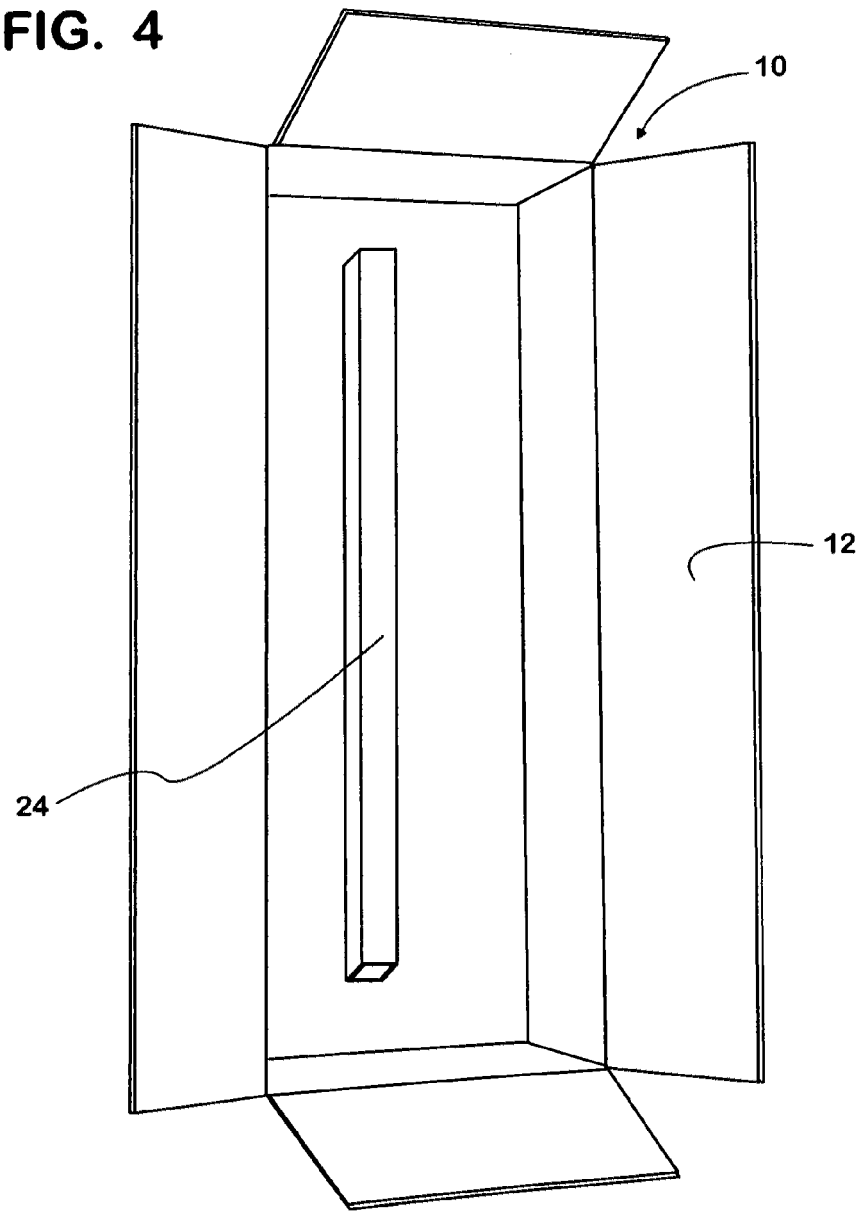
FIG. 4 is similar to FIG. 3 but shows only a single cart part left in bottom of the box or carton.

Beginning with FIGS. 1-4, a kit is shown to form when assembled the first embodiment of the rolling cart 10 of the present invention. The kit is shown as it would be purchased in a shipping carton or box 12, the various parts of the cart 10 being positioned in several layers within the box 12 to make it compact and easy to store before purchase, ship, and/or to carry. FIGS. 2-4 show how the various layers of parts for the first embodiment 10 as when removed from the box 12.

Figure 5:
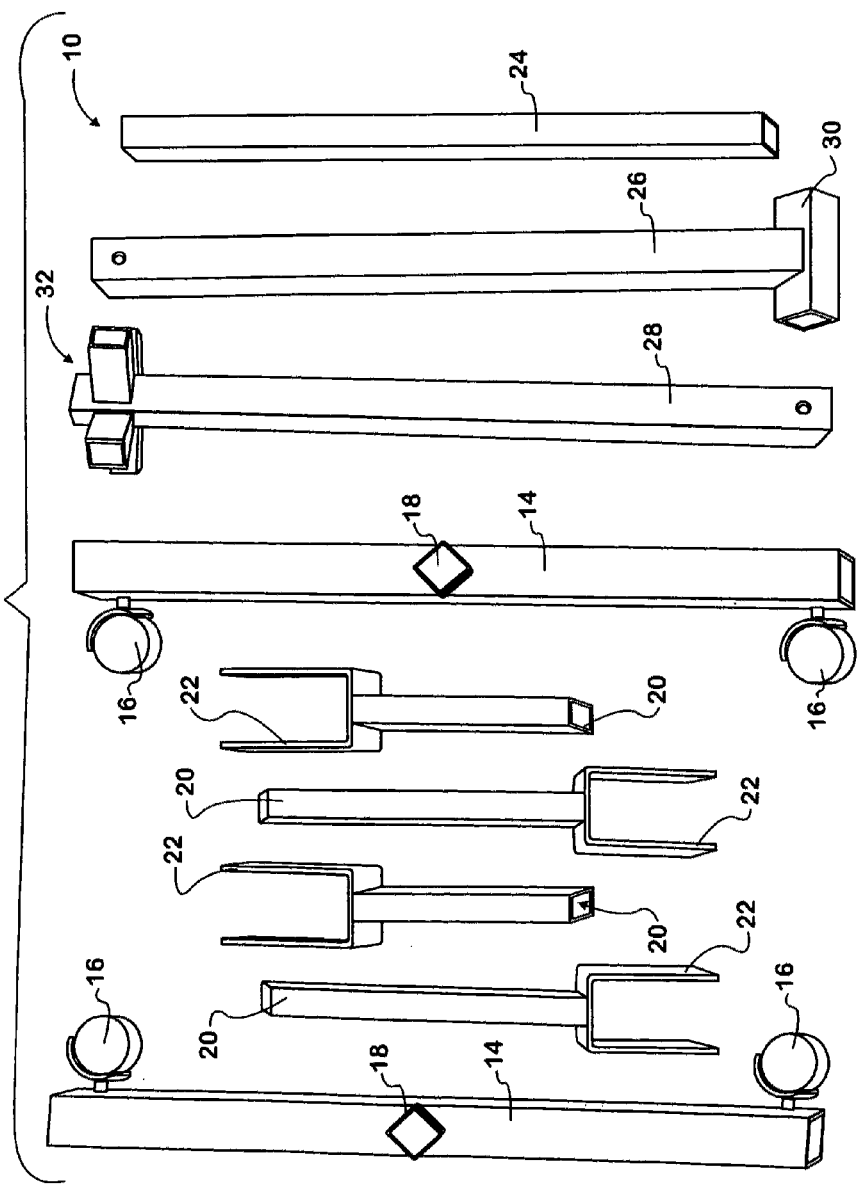
FIG. 5 is a perspective view showing all the cart parts of the first embodiment of the cart.

FIG. 5 shows all the parts of the first embodiment 10 after being removed from the box 12. It will be seen that the first embodiment is comprised of two end parts 14 having (four) wheels 16, one at each end thereof and having a hollow tube or sleeve 18 substantially centered therealong, facing a direction perpendicular to the wheels 16. Also shows are a plurality of arms 20 having holding means 22, such as forks or clamps 22 on one end thereof. Further, there is provided a cross member 24 and two telescoping bottom and top upright parts, 26 and 28, respectively, with the bottom telescoping upright part 26 having a hollow tube or sleeve 30 at one end thereof and the top telescoping upright part 28 having a plurality of hollow tubes or sleeves 32 at one end thereof, the hollow tubes or sleeves 32 being equal in number to the number of arms 20 and to receive the same. In the preferred embodiment 10 shown, the number is four, though this should not be construed as limiting. For example two, three, five, six, seven or eight arms could be provided. Further, in the preferred embodiment 10 shown, substantially all the parts of the cart 10 are made from hollow, square or rectangular in cross section material, such as steel, aluminum or plastic. Generally, any non-circular cross-section could be used to prevent rotation. Although for some parts of the cart even round cross-sections could be used where rotation was not a concern.

Figure 6:
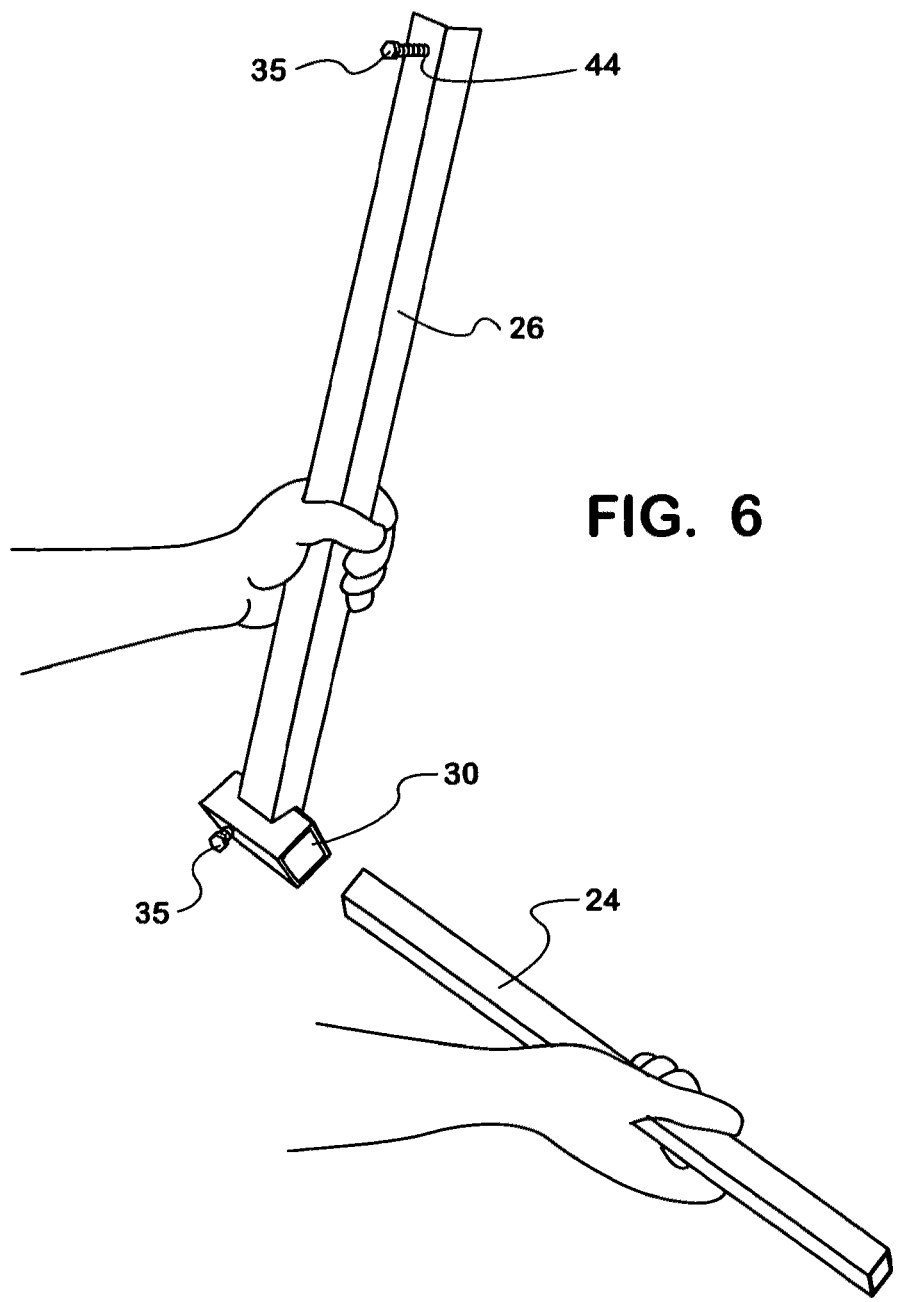
FIG. 6 is a perspective view showing a center upright of the first embodiment aligned for engagement to a bottom cross member of the embodiment.

FIG. 6 shows cross member 24 being aligned with an entrance into the hollow tube or sleeve 30 of the bottom upright 26, the tube or sleeve 30 being perpendicular to the upright 26, and which will lie in a horizontal plane when the embodiment 10 is constructed. The tube or sleeve 30 is of a slightly larger dimension in cross section than the cross member 24 to fit over the latter. Of course, a reverse construction of cross-sections could be used.

Figure 7:
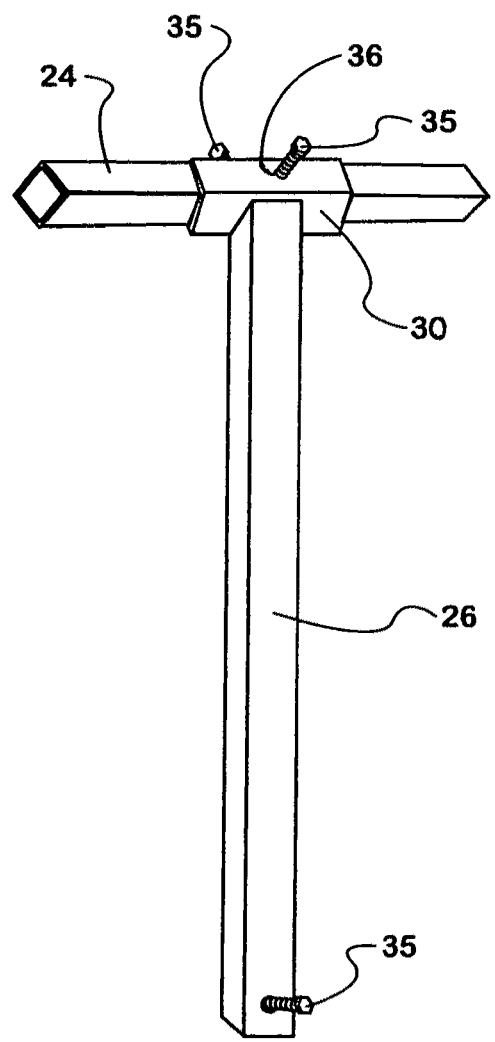
FIG. 7 is a perspective view showing the bottom cross member fixed to the center upright at a centered position along the cross member, the cross member being received within a hollow tube or sleeve of the center upright and being fixed thereto and therewithin by frictional engagement via a connector passing through the hollow tube or sleeve and pushing against the cross member therewithin.

In FIG. 7 the cross member 24 is shown having been slid through the hollow tube or sleeve 30 to a position where the hollow tube or sleeve 30 is substantially centered along a length of the cross member 24. The cross member 24 is fixed in this position relative to the tube or sleeve 30 by means of a connector 35, such as a bolt 35, passing through at least one bore 36 in the tube or sleeve 30. Alternatively, the bore 36 could have a threaded portion and/or attached nut (as by welding) and frictionally compressing against cross bar 24 therewithin.

Figure 8:
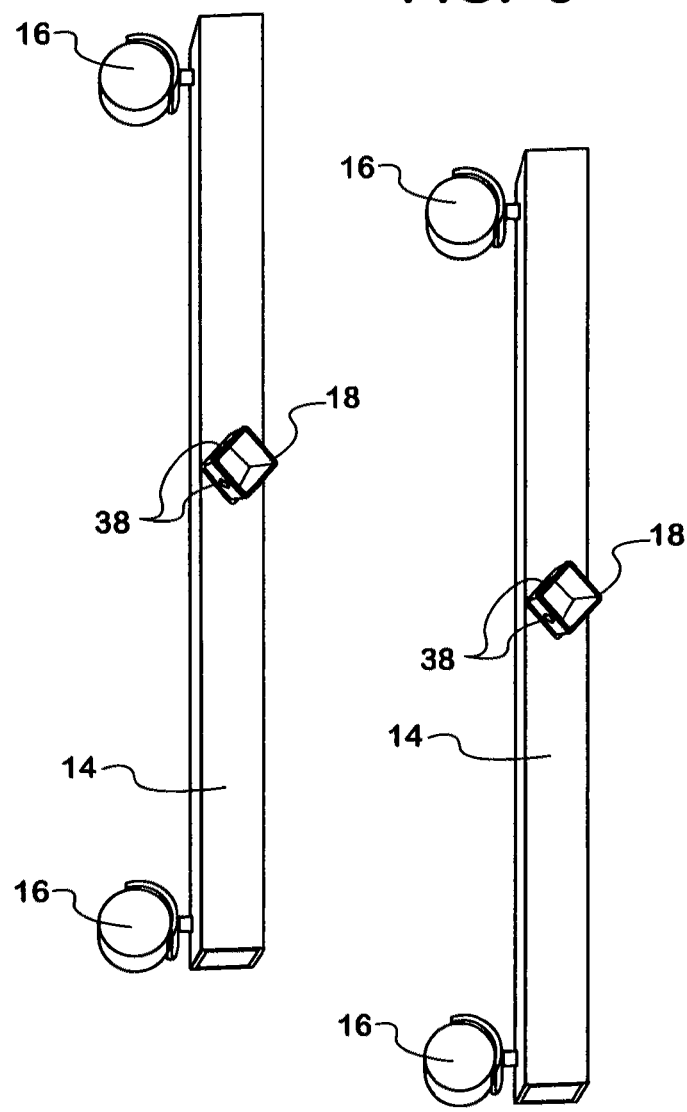
FIG. 8 is an enlarged perspective view showing two bottom end parts, each of which engages to one end of the cross member, the cross member end sliding into a hollow tube or sleeve therefore at a centered position along the length of each bottom end part and showing each bottom end part to have wheels thereon for easy transport at once of all the parts of the tree on the cart once assembled.

FIG. 8 provides an enlarged perspective view of the end parts 14 which have wheels 16 at the ends thereof and include the hollow tubes or sleeves 18 at a position perpendicular to the position of the wheels 16. The wheels permit easy transport of the cart, particularly with the tree components thereon.

Figure 9:
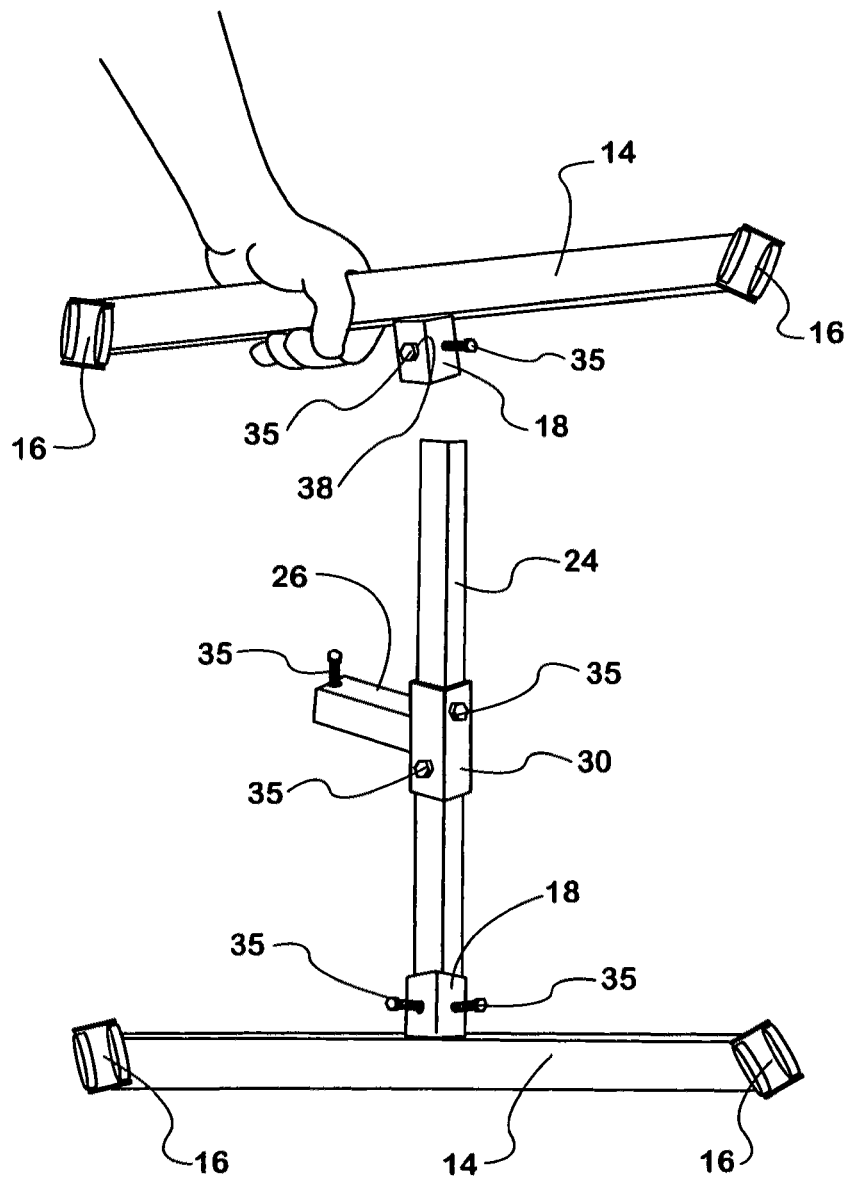
FIG. 9 is a perspective view showing the bottom end parts being frictionally engaged to each end of the cross member through use of connectors passing through the hollow tubes or sleeves of the end parts and pushing against cross member seated therewithin.

FIG. 9 provides a perspective view showing the end parts 14 being engaged one to each end of the cross member 24, with all the wheels 16 lying in the same plane and the two hollow tubes or sleeves 18 each engaging over one end of the cross member 24 and being fixed thereover by engagement of a connector 35, such as a bolt 35, which extends through at least one bore 38 in each hollow tube or sleeve 18 or be constructed as described above to frictionally engage against an end of the cross member 24 seated therein.

Figure 10:
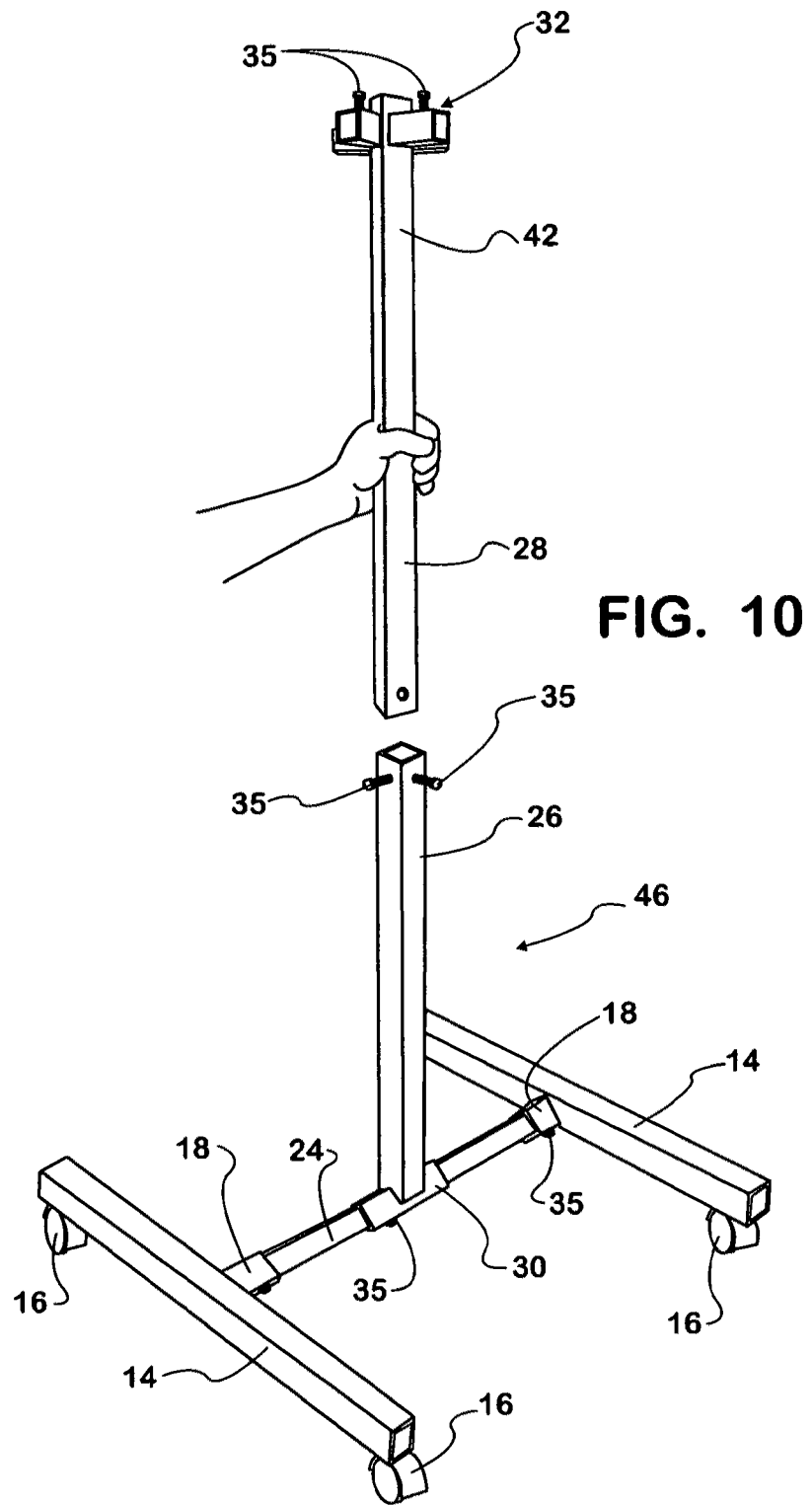
FIG. 10 is a perspective view showing a telescoping upright part being aligned with the center upright to be received telescopically within the free upper end of the center upright, the telescoping upright part having a plurality of horizontally disposed open tubes or sleeves on an upper end thereof.

In FIG. 10, with the wheels 16 now resting along the ground, and this construction forming what would be considered a base 46 of the embodiment 10, the top telescopic upright 28 is now positioned over the bottom telescopic upright in a manner where the top upright 28 can be slid into the slightly larger in dimension bottom upright 26, with the plurality of hollow tubes or sleeves at a top end 42 of the top upright 28 now lying in a horizontal plane.

Figure 11:
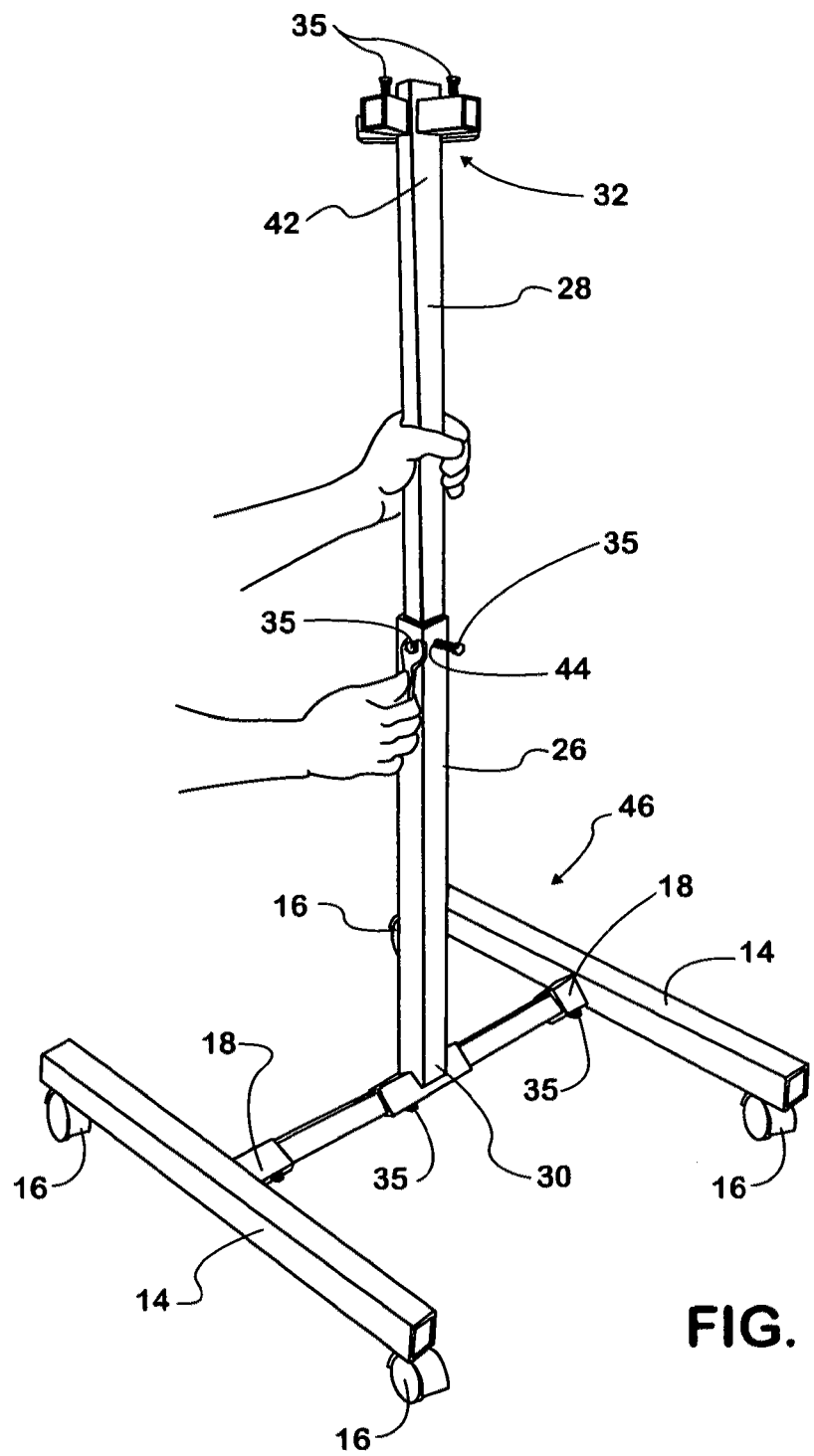
FIG. 11 is a perspective view showing the telescoping upright part being fixed in desired position within the center upright by frictional engagement of a plurality of connectors through the center upright and against the telescoping upright part seated therewithin.

Continuing as shown in FIG. 11, once the top upright 28 is slid into the bottom upright 26 to a desired position, at least one connector 35, such as a bolt 35, is passed through a bore 44 (alternatively threaded or with a nut secured thereto) in the bottom upright 26 and is frictionally engaged against the end of the top upright 28 to fix the relative positions of the uprights 26 and 28.

Figure 12:
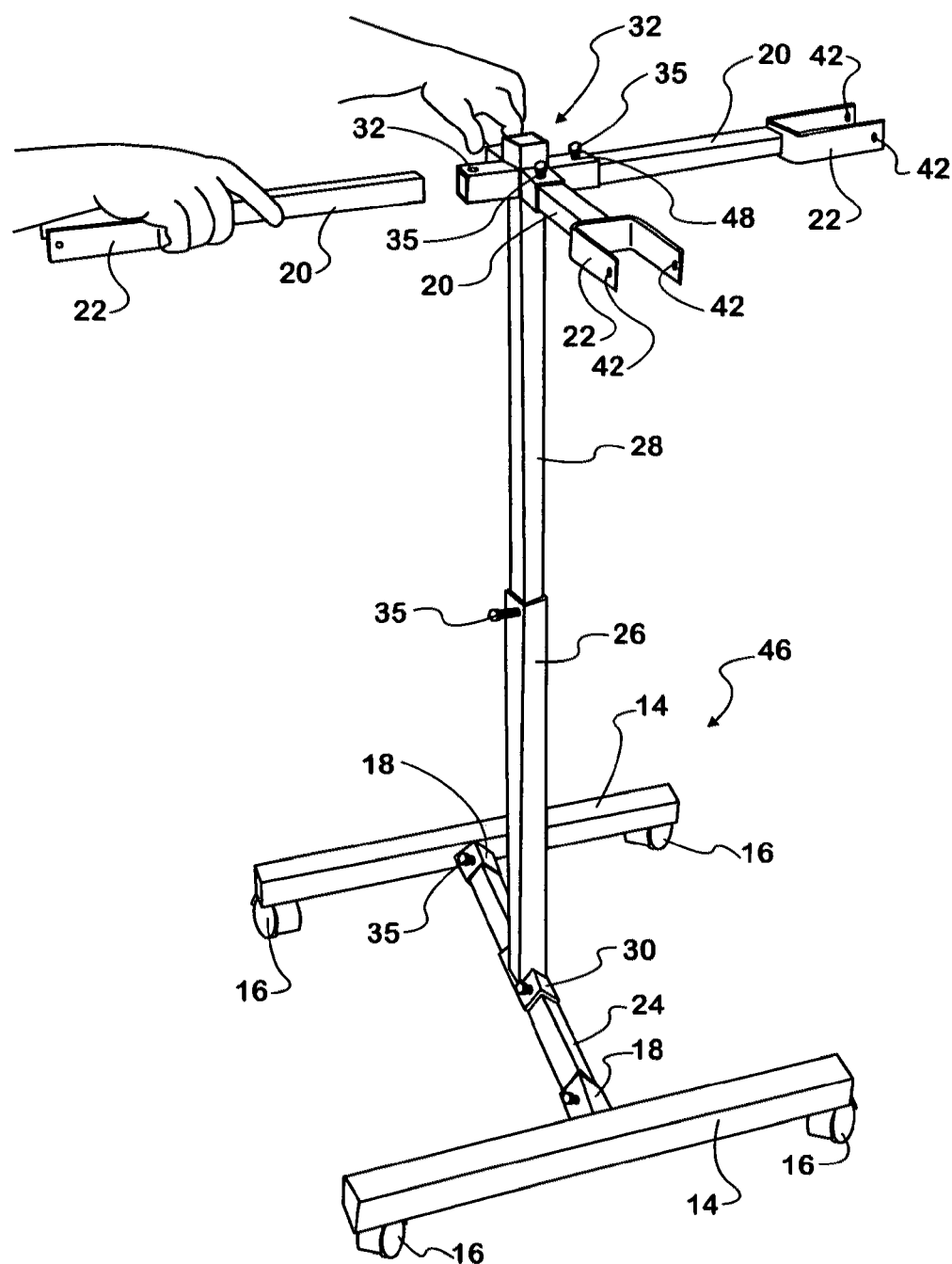
FIG. 12 is a perspective view showing a plurality of horizontally extending arms having holding means, in this instance in the form of U shaped or fork sections on free ends thereof, each horizontally extending arm being engaged to one of the horizontally disposed tubes or sleeves of the telescoping upright part, each such arm being frictionally engaged to its corresponding tube or sleeve by means of frictional engagement of at least one connector through the tube or sleeve and against the arm therewithin.
Figure 13:
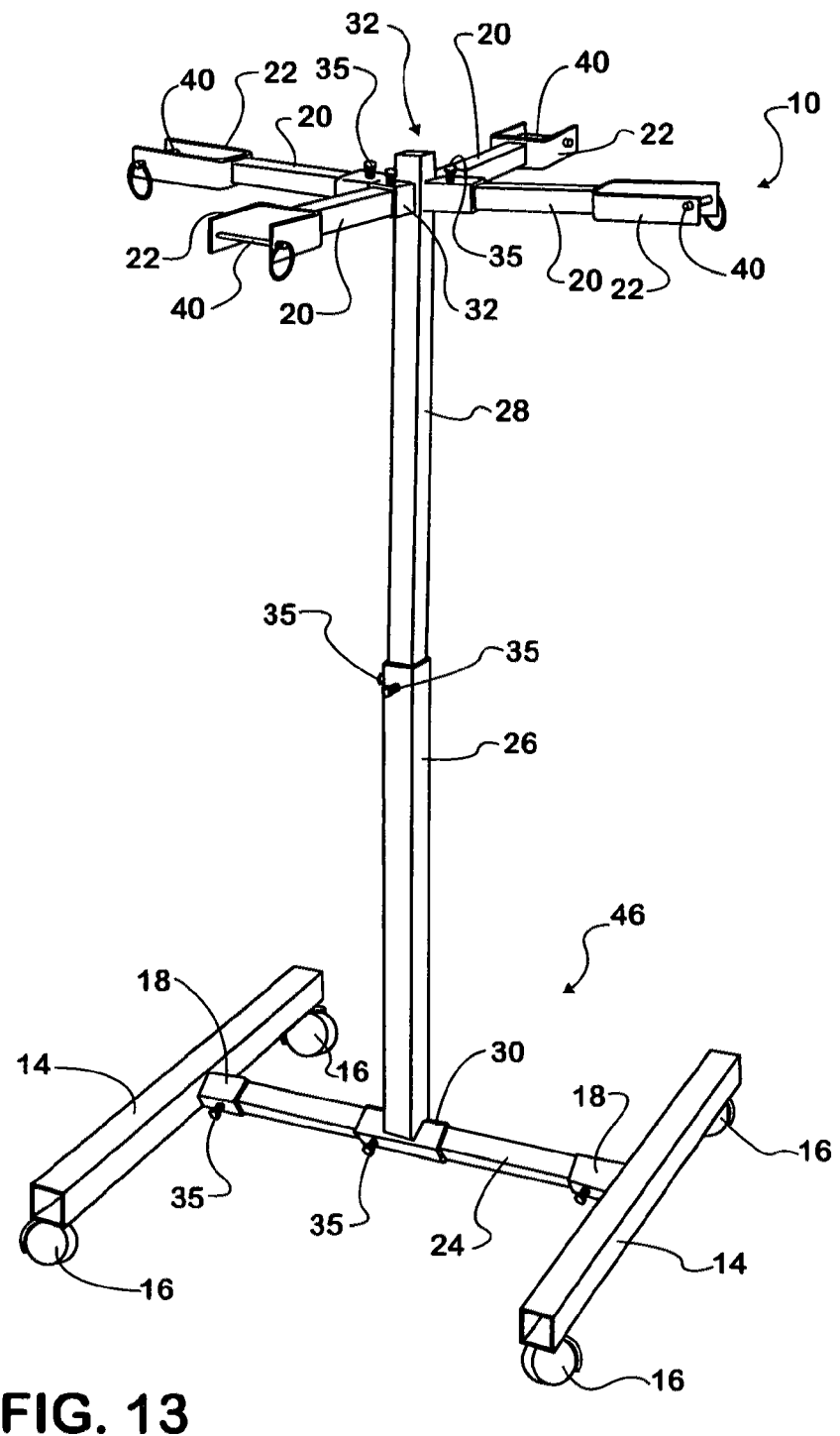
FIG. 13 is a perspective view of the first embodiment of the assembled cart of the present invention and shows locking pins passing through aligned bores in the ends of each of the U shaped forks to form holding means or clamps at the ends of the horizontal arms and can engage with one of the parts of the tree.

As shown in FIG. 12, the plurality of arms 20 are each slid into one of the now horizontally disposed tubes or sleeves 32 of the top upright 28 and at least one connector 35, such as a bolt 35, is passed through a bore 48 in the tube or sleeve 32 and is frictionally engaged against the end of the arm 20 seated therewithin, to create the embodiment 10 shown fully assembled in FIG. 13.

Figure 14:
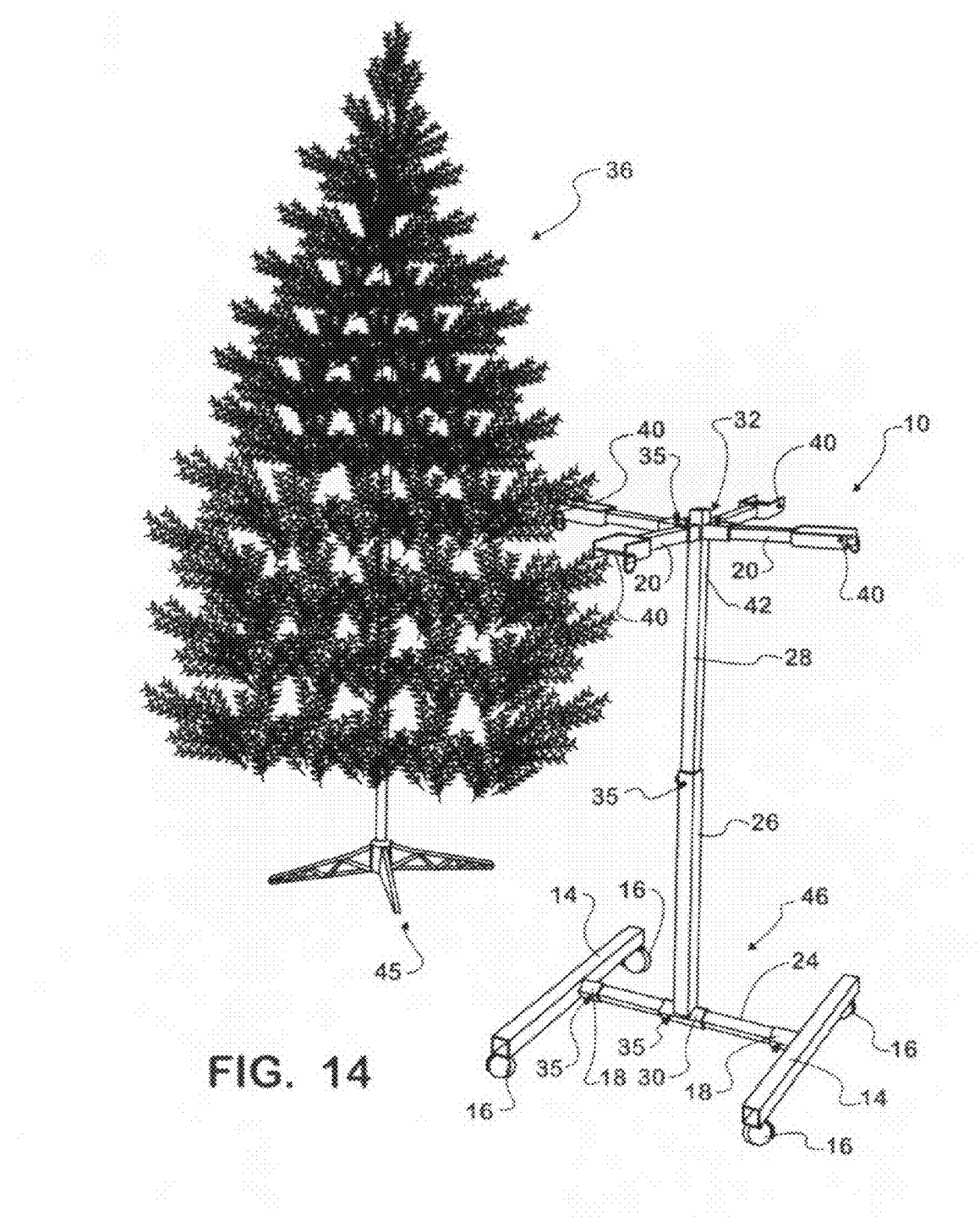
FIG. 14 is a perspective view showing the embodiment of FIG. 13 next to an artificial Christmas tree to be dismantled and its parts engaged and stored on the cart.
Figure 15:
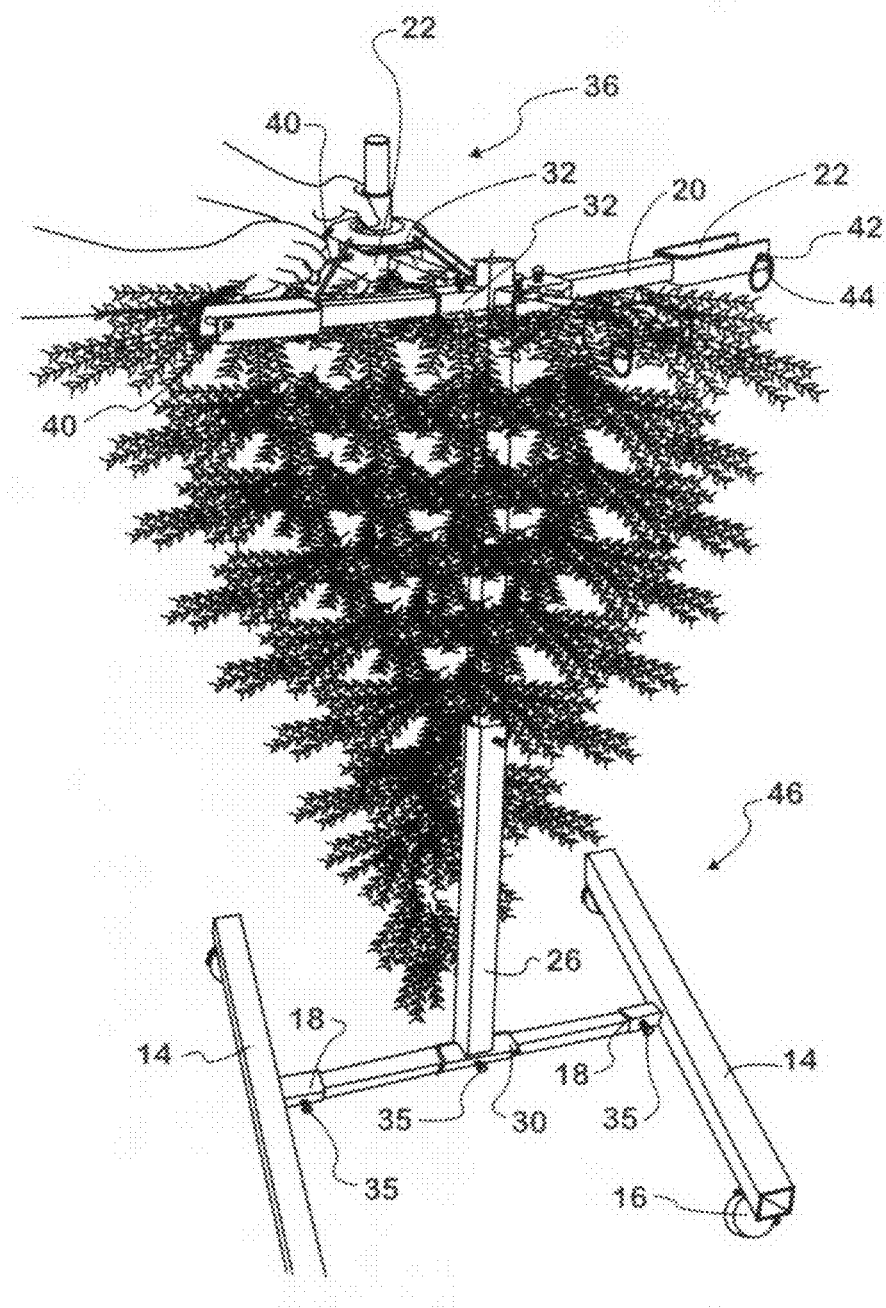
FIG. 15 is a perspective view showing the artificial Christmas tree of FIG. 14 being dismantled into its vertical sections, with the vertical parts sections being engaged to the cart by placement of the center pole of the sections through each of the U shaped clamps and having the pins engaged through the aligned bores in the ends thereof to keep the sections in position on the cart.
Figure 16:
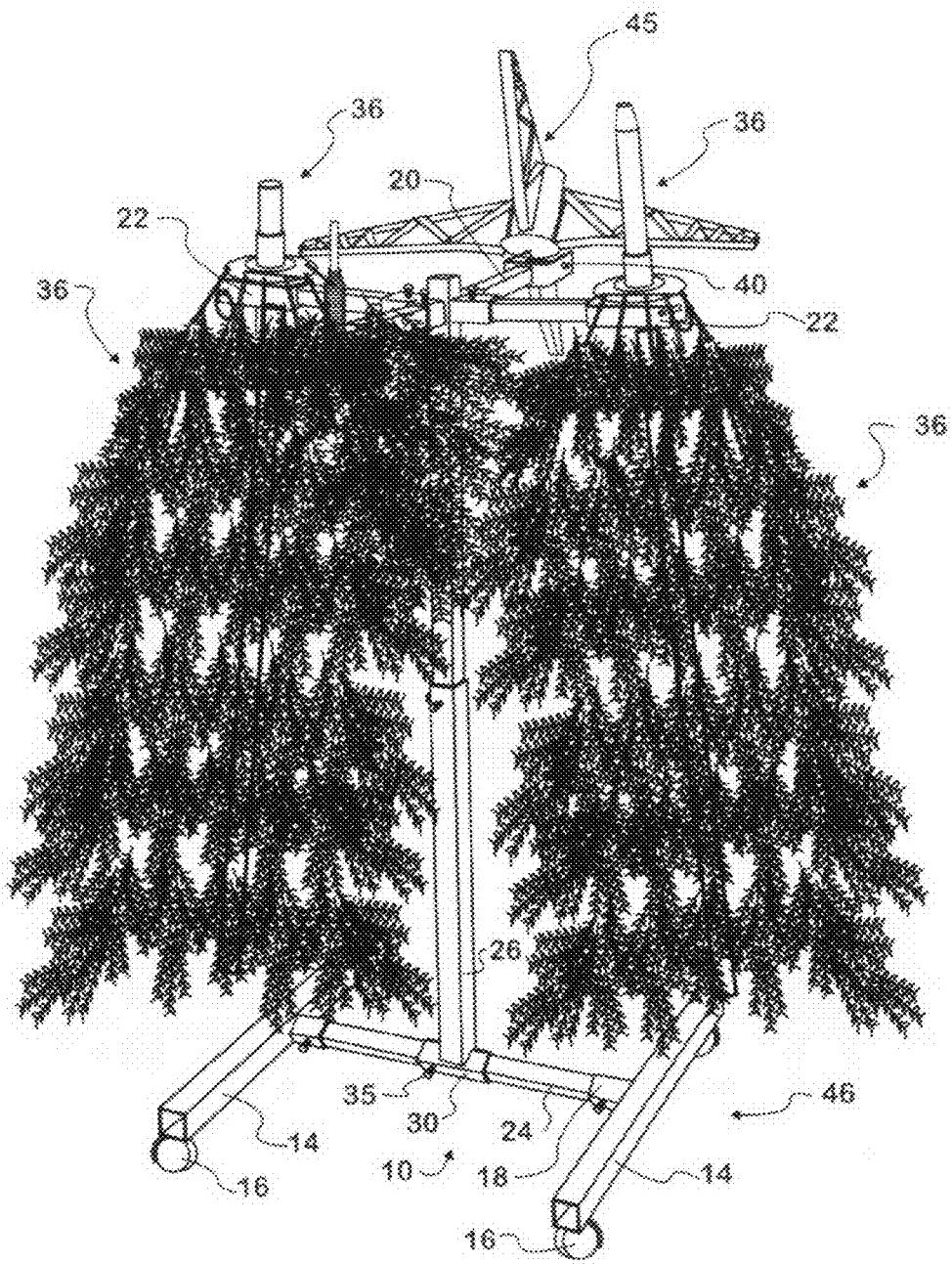
FIG. 16 is a perspective view showing the vertical sections of the artificial Christmas tree engaged to the cart and further showing a stand or base for the tree engaged within one of the U shaped clamps.
Figure 17:
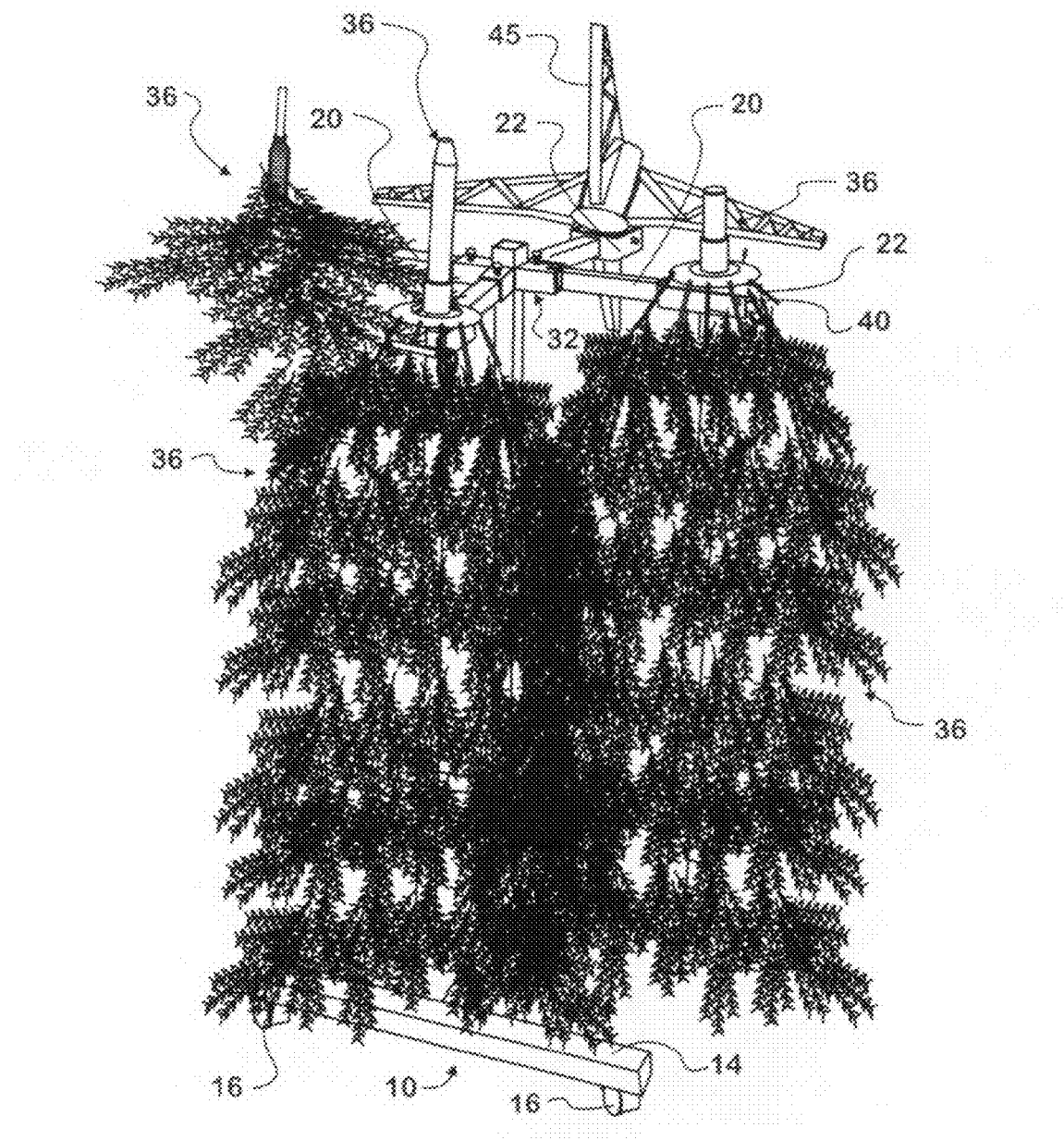
FIG. 17 is an enlarged but somewhat different perspective view similar to that of FIG. 16.

In use, as shown in FIG. 14, the cart 10 is brought into a position close to an artificial Christmas tree 36 being dismantled into its various parts for storage. In FIG. 15, part of the tree 36 is shown being engaged to one of the holding means 22 by sliding any engageable structure of the tree part over and into the holding means 22 and then completing the engagement of the part within the holding means by sliding the pin 40 through a pair of aligned openings 42 in the free ends 44 of the holding means 22. This process is continued until every part of the tree 36, including a tree stand or base 45 thereof, is engaged onto the cart 10, as illustrated in FIGS. 16 and 17. After all the parts are placed on the cart 10, it can be rolled on its wheels to a place of storage. If desired a cover can be placed over the tree parts stand and cart 10, to keep dust and dirt off the same.

Figure 18:
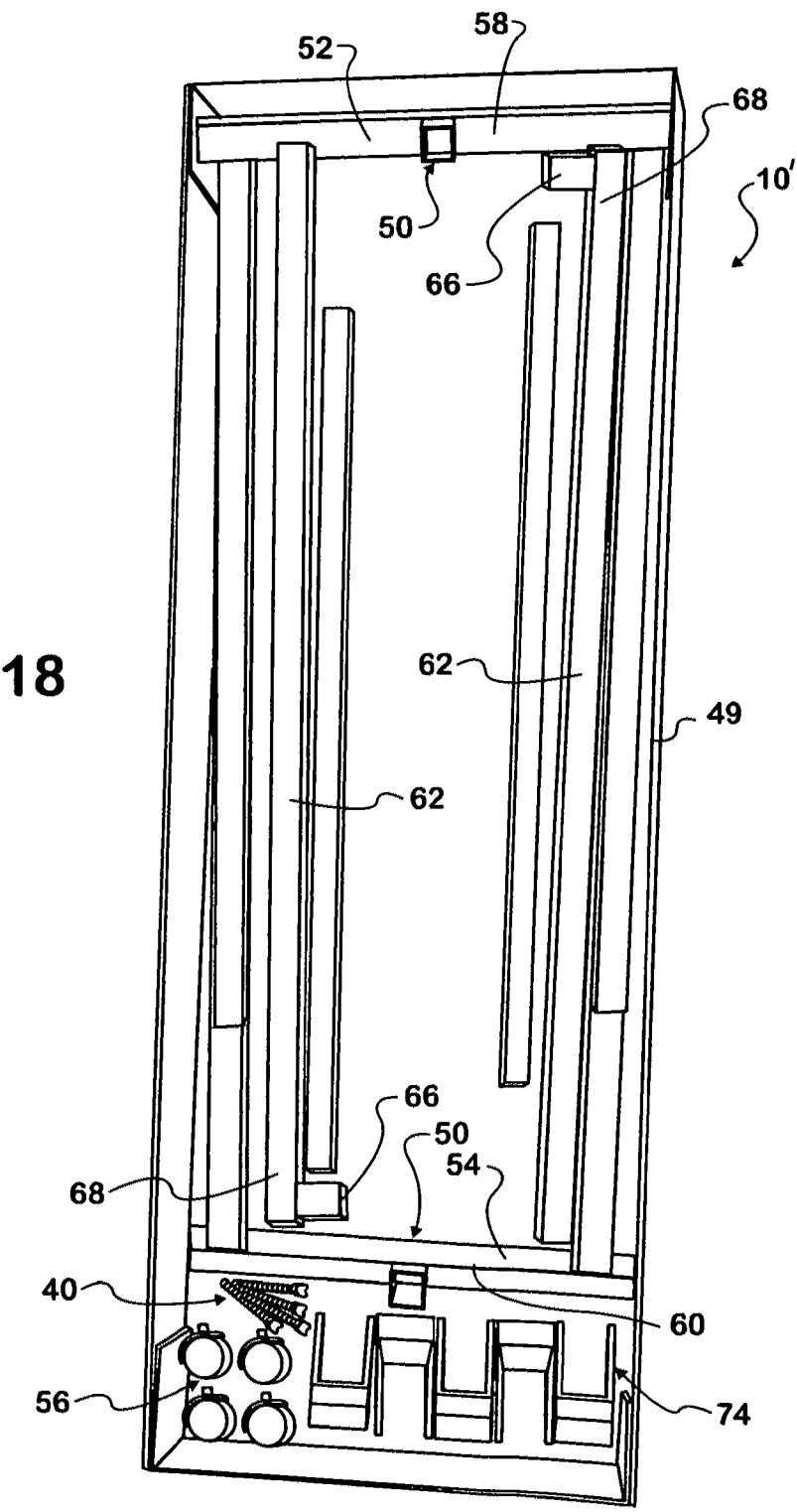
FIG. 18 is a perspective view showing all the parts of a second embodiment of the cart of the present invention, unassembled, in a shipping carton box, lying in a single layer.
Figure 19:
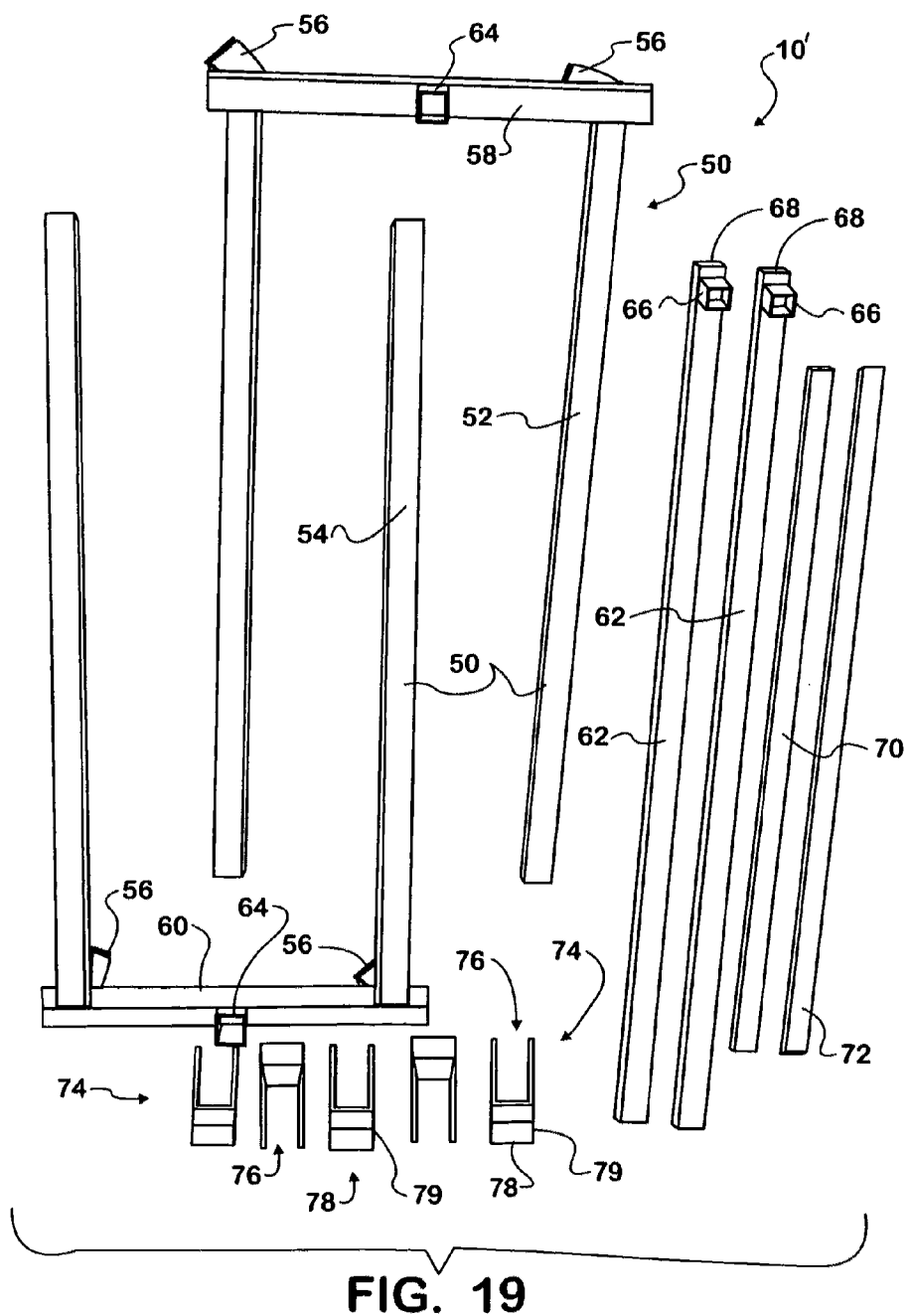
FIG. 19 is a perspective view showing all the parts of the second embodiment, after removal from the box.

FIG. 18 shows a second embodiment 10' of the rolling cart for an artificial Christmas tree 36. It should be noted that the embodiment 10' is larger than embodiment 10, and the former can store a larger, more parts, artificial Christmas tree.

Figure 20:
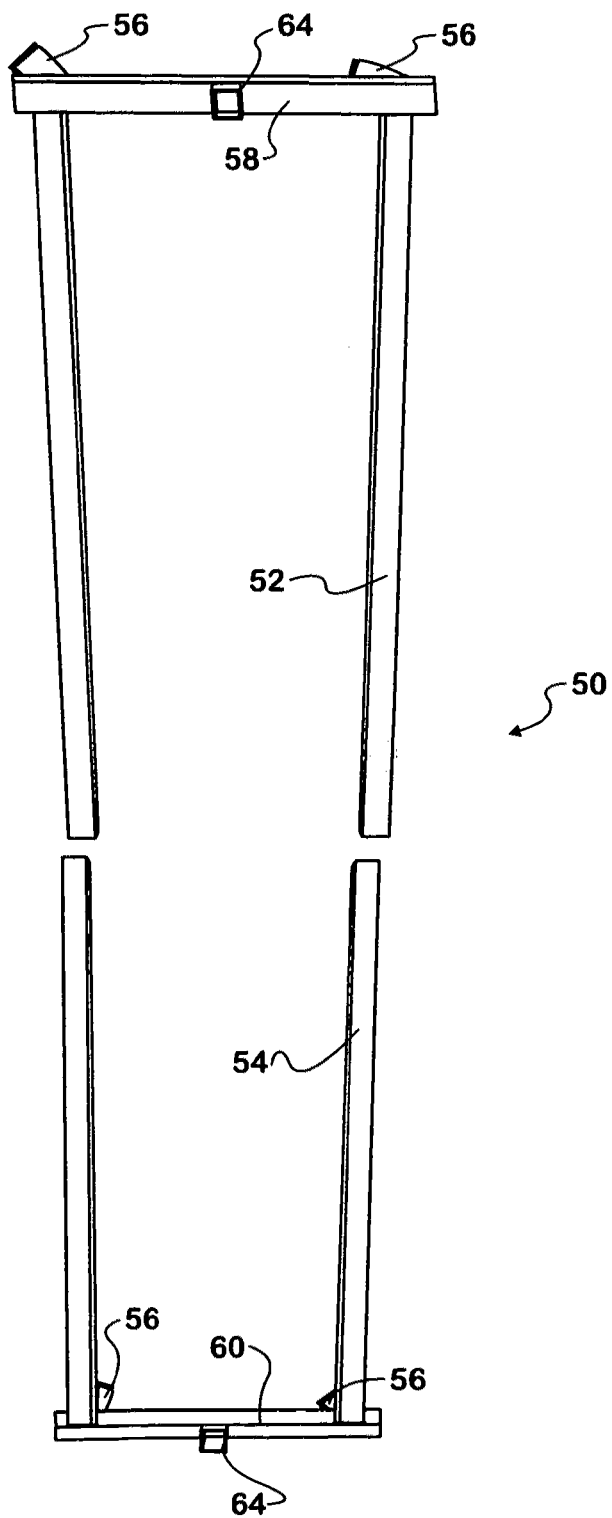
FIG. 20 is a perspective view showing two telescopic parts of the bottom or base of the second embodiment aligned for engagement therebetween, each part comprising two elongate sections having a cross member engaging them together at one end thereof, and each cross member having wheels thereon and a hollow centered tube or sleeve therealong extending vertically therefrom.
Figure 21:
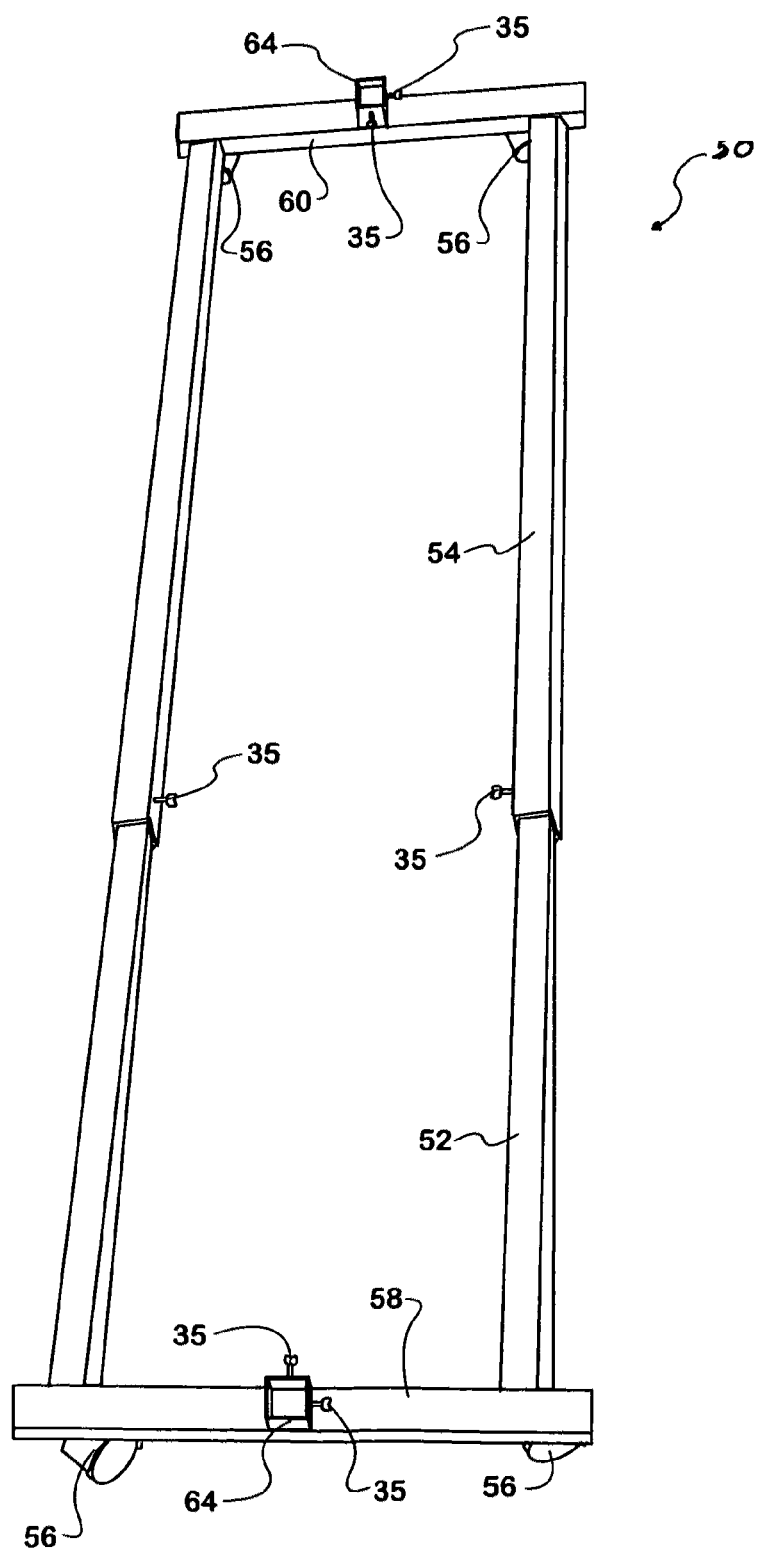
FIG. 21 is a perspective view showing the parts frictionally engaged to each other by connectors extending through an outer telescopic section and against an inner telescopic section.
Figure 22:
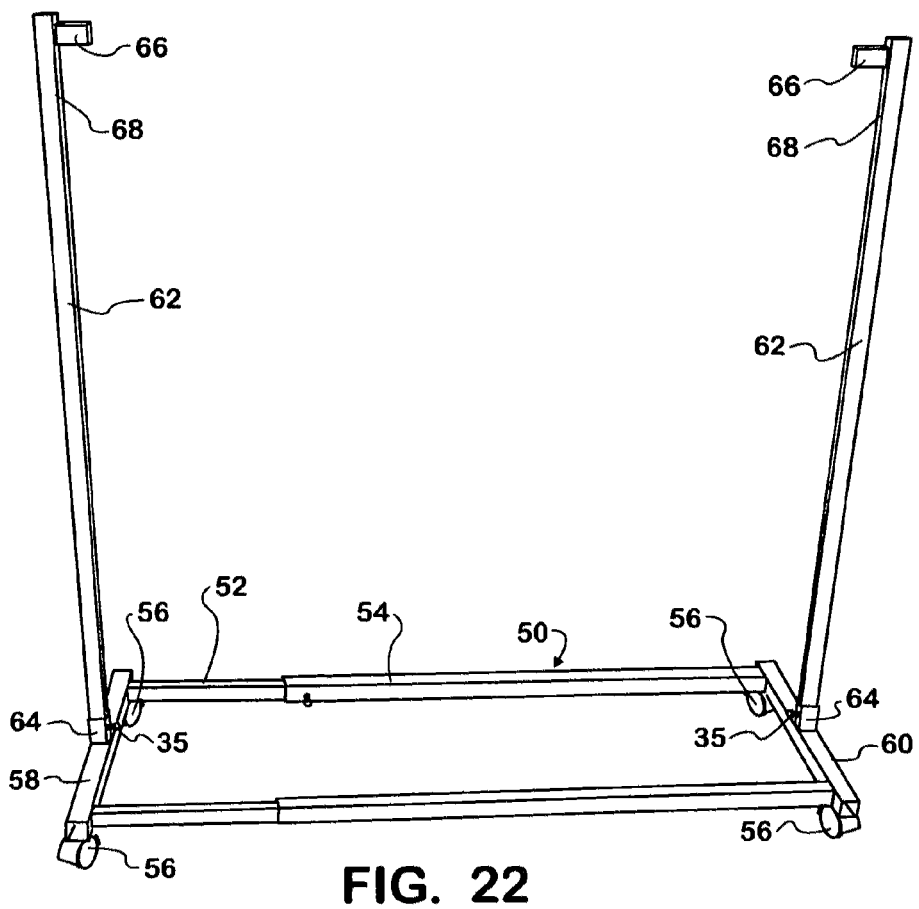
FIG. 22 is a perspective view showing an upright part of the cart engaged at each end of the base, by seating within the hollow tube or sleeve and being frictionally engaged thereto by means of at least one connector extending through the tube or sleeve (threaded) and frictionally abutting the upright part therewithin, each upright part having a hollow tube or sleeve at a top end thereof directed toward the opposite upright part.
Figure 23:
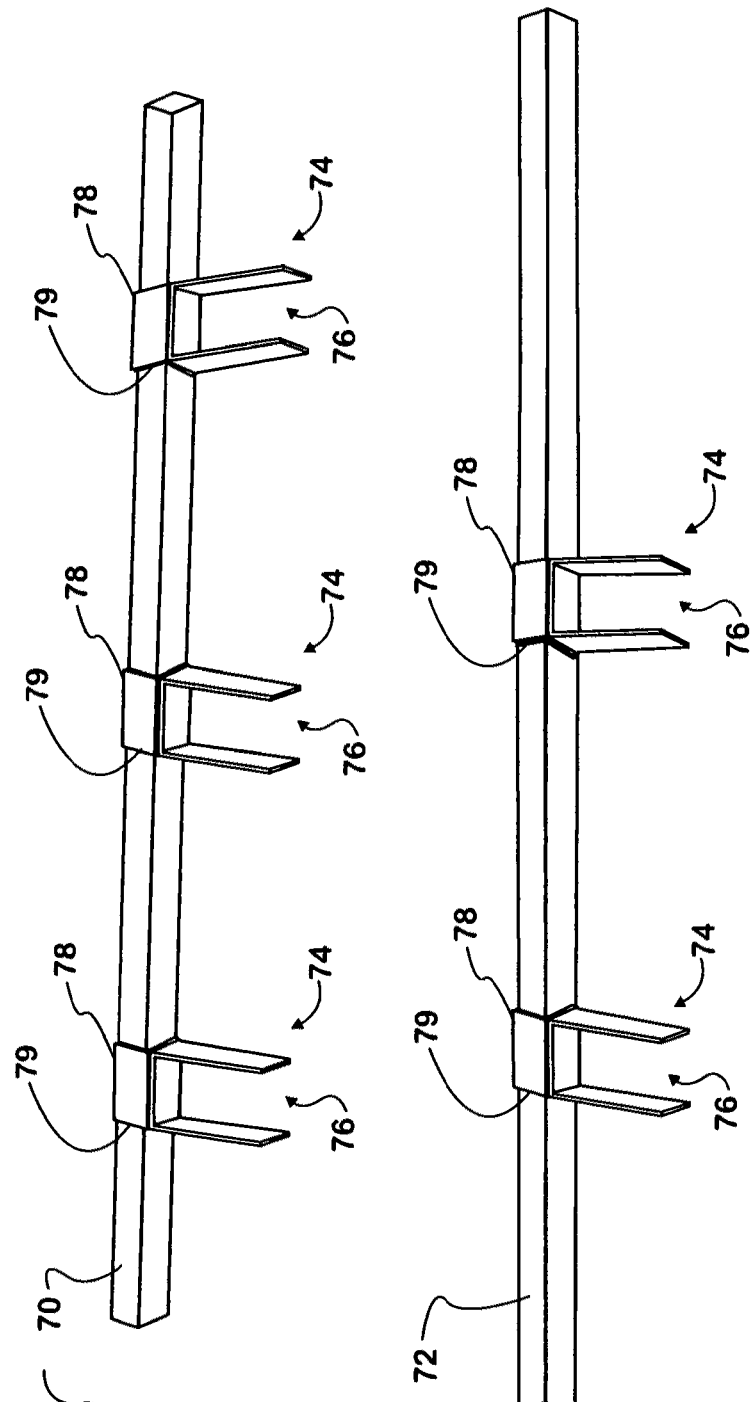
FIG. 23 is a perspective view showing a pair of horizontal top bars having holding means in the form of U shaped forks or portions, or could be clamps slidably received at desired locations therealong via a tube or sleeve of each clamp which slides over and along the top horizontal bars, the horizontal top bars being telescopic relative to each other.
Figure 24:
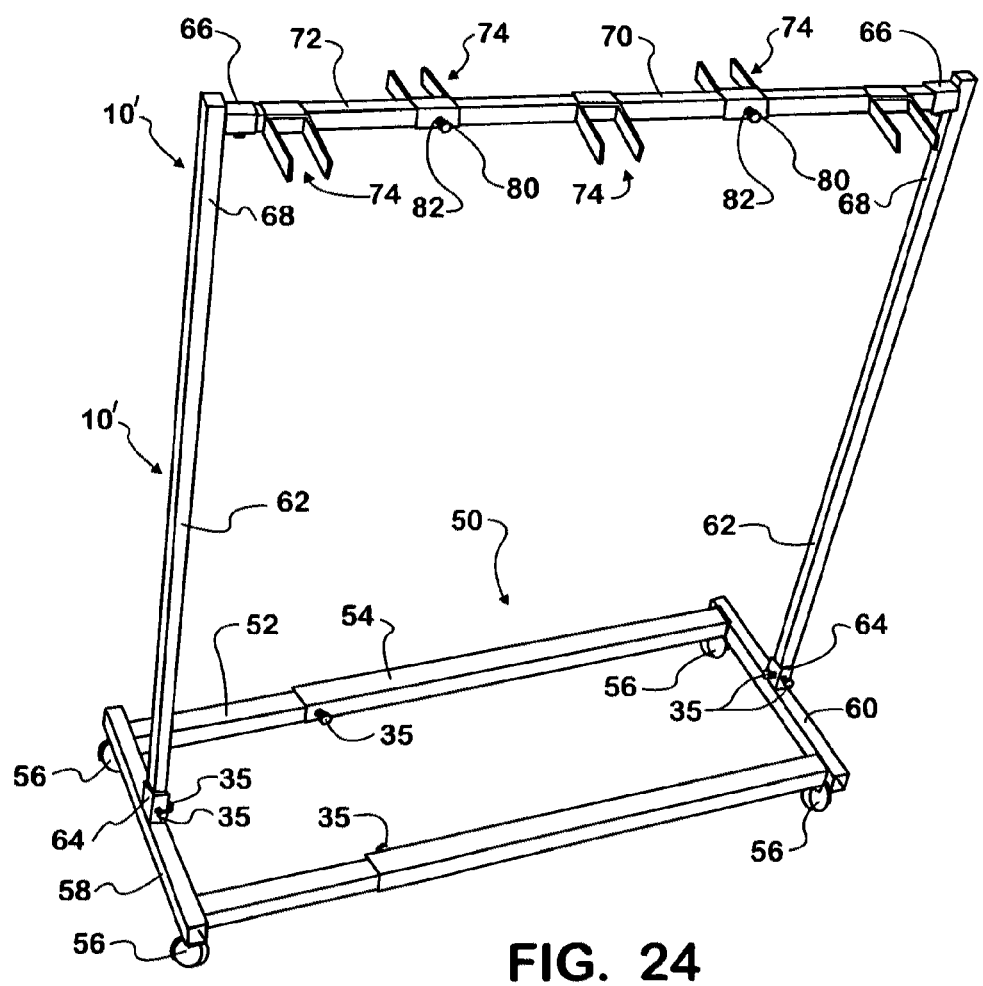
FIG. 24 is a perspective view showing a completed second embodiment of the cart of the present invention, with the two horizontal top bars telescoped together with a free end of each being received in an opposite horizontal tube or sleeve of the upright parts and having the U shaped forks or clamps fixed in position by connectors extending through the tube or sleeve of each clamp and frictionally engaging against the horizontal top bar therewithin.

In FIG. 18, the embodiment 10' is shown within a shipping carton or a box 49 for same, wherein the parts fit therein in a single layer. Viewing FIG. 18 in combination with FIG. 19, the second embodiment 10' is seen to include a base 50 comprised of two telescoping pieces 52 and 54, the base 50 being adapted to have wheels 56 engaged thereto along end sections 58 and 60, respectively of telescoping pieces 52 and 54, as best shown in FIGS. 20 and 21. Also provided are a pair of uprights 62, each of which engages within a hollow tube or sleeve 64 provided in the end sections 58 and 60, at a substantially centered position therealong, on a side opposite that to which the wheels 56 are engaged, as shown in FIG. 22. Each upright 62 in turn includes a hollow, perpendicular tube or sleeve 66 at an upper end 68 thereof, each of which pair of sleeves 66 is used to engage one end of one of a pair of telescoping horizontally disposed top pieces 70 and 72, as shown in FIG. 24. Along these telescoping pieces 70 and 72 are slidingly received a plurality of holding means 74 (see FIG. 23) which are configured to have a pair of open ends 76 and a closed end 78 formed by a hollow tube or sleeve 79, with a cross dimension larger than the top pieces 70, 72 so that sleeves 79 may be slid thereover and fixed thereto by connectors 80, such as bolts 80, which extend through a bore 82 (alternatively threaded or included a nut secured thereover) in the hollow sleeve or tube 79 at closed end 78 and against the top pieces intermittently along the length of the top pieces 70, 72, as best shown in FIG. 23.

FIG. 24 shows the fully assembled embodiment 10' of the cart of the present invention.

Figure 25B:
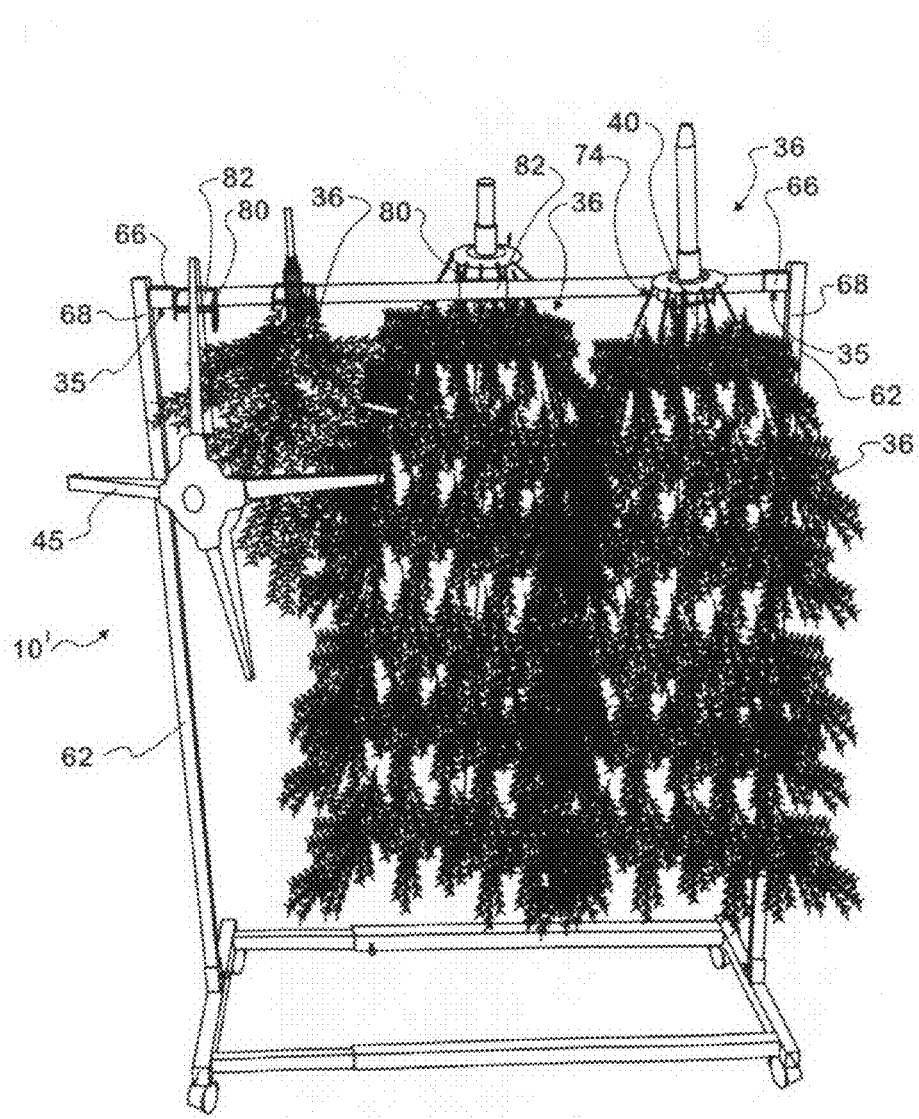
FIG. 25B is a perspective view showing the cart of FIG. 24 almost fully contracted in a horizontal direction and having three tree sections and the tree base or stand engaged thereto via the holding means or forks or clamps.

In FIG. 25A the second embodiment 10' is shown in a fully contracted position and in FIG. 25B in a fully extended position, respectively. In the fully contracted position, it is suitable for use in a smaller storage area and is suited for use with a smaller tree with less and smaller parts. In the fully extended position, it is suited for use with a larger tree with more and larger parts that require more space for storage.

Although the Figures show the cart 10 or 10' in use for engaging tree parts for storage thereof, it will be understood that the carts are also used for construction of the tree the following Christmas season. In this respect, the cart 10 or 10' is brought from the storage area to a position substantially near to where the tree is desired to be positioned. The tree base 45 is removed from the cart first and then the remaining parts are removed in the respective order, one at a time, from bottom part to top part, and the tree 36 is reconstructed.

As described above, the cart 10 or 10' and method of constructing and/or using same, provide a number of advantages, some of which have been described above and others of which are inherent in and apparent from the invention.

It should be noted that the telescopic pieces could have various other cross-sections, such as rectangular or non-circular or even circular where part rotation is not a problem. Further, as to telescopic pieces, the reverse telescopic construction could be used. Also the inner telescopic piece could be made of a solid cross-section rather than hollow.

Typical size pieces for the various parts could be made from square or rectangular or other cross section tubing, say from 1"×1" to say 3"×3" (or 1" to 3" diameter where round tubing could be used), with a side wall of from 1/16" to 1/4" thick. Not all pieces need be identically or similarly sized, but could vary. The overall erected dimensions for embodiment 10 could, for example, be 26 to 50 inches in height with about 30 inches to 46 inches preferred, 20 to 28 inches in width, with about 24 inches preferred, and 20 to 28 inches in length, with 24 about inches preferred. The overall erected dimensions for embodiment 10' could, for example, be 48 to 56 inches in height, with about 52 inches preferred, 16 to 24 inches in width, with about 20 inches preferred, and 39 to 80 inches in length, with about 43 to 76 inches preferred. Of course, the height of embodiment 10 could be extended 25% to 50% of its lowest height. The length of embodiment 10' could, itself, be telescopically stretched say from 25% to 50% of its total unstretched length. The larger ranges above reflect the fact portions of the carts could telescope, for example, height in embodiment 10 and length in embodiment 10'. Of course, as alternatives, either embodiment could be constructed with other telescopic dimensions or no telescopic dimension.

Modifications may also be proposed to the carts 10, 10' without departing from the teachings herein. Also, equivalent elements and/or equivalent steps would fall within the scope of the invention as set forth in the following claims.

What is claimed is:

1. An artificial Christmas tree rolling storage cart for storage of a multiple section artificial Christmas tree of height greater than six feet, comprising a wheeled base supporting an upright section having a plurality of holding means thereon to which sections of the artificial Christmas tree are engageable for storage out of season and which is positioned next to the tree during dismantling thereof and for reuse of the artificial Christmas tree for a following season, said upright section having at least two tubular elements that may be moved relative to one another to change the height of the upright section and cart to accommodate different size or number of artificial Christmas sections.

2. An artificial Christmas tree rolling storage cart as in claim 1, wherein said wheeled base has at least two wheels permitting the cart to be rolled.

3. An artificial Christmas tree rolling storage cart as in claim 2, wherein said cart has four wheels.

4. An artificial Christmas tree rolling storage cart as in claim 1, wherein said base comprises a plurality of tubular elements.

5. An artificial Christmas tree rolling storage cart as in claim 2, wherein at least some of said plurality of elements mount two or more wheels.

6. An artificial Christmas tree rolling storage cart as in claim 1, wherein said base and said plurality of tubular elements are "X" or cross shaped in a plane parallel to the ground.

7. An artificial Christmas tree rolling storage cart as in claim 6, wherein said upright section rises from the center of said "X" or cross shaped base.

8. An artificial Christmas tree rolling storage cart as in claim 1, wherein said base and said tubular elements are one of rectangular or square shaped in a plane parallel to the ground.

9. An artificial Christmas tree rolling storage cart for storage of a multiple section artificial Christmas tree of height greater than six feet, comprising a wheeled base supporting an upright section having a plurality of holding means thereon to which sections of the artificial Christmas tree are engageable for storage out of season and which is positioned next to the tree during dismantling thereof and for reuse of the artificial Christmas tree for a following season, said wheeled base including two spaced apart base tubular elements, said upright section rising from two of said base tubular elements which are opposite one another, further including an upper horizontal bar extending from adjacent the top of one upright section and across to the top of the other upright section, the base tubular elements and upper horizontal bar increases in length to accommodate larger or further artificial Christmas tree sections.

10. An artificial Christmas tree rolling storage cart as in claim 9, wherein said tubular elements of said base are telescopically constructed and said upper horizontal bar is also telescopically constructed to permit the changes of their respective lengths.

11. An artificial Christmas tree rolling cart as in claim 10, wherein said holding means is in the form of one of a fork or clamp, one end of the fork or clamp being connected to the upper horizontal bar and the other end of the fork or clamp being adapted to engage an artificial Christmas tree section to hold the same.

12. An artificial Christmas tree rolling cart as in claim 6, wherein said holding means is in the form of one of a fork or clamp, one end of the fork or clamp being connected to the upright section and the other end of the fork or clamp being adapted to engage an artificial Christmas tree section to hold the same.

13. An artificial Christmas tree rolling cart as in claim 1, wherein said holding means is in the form of one of a fork or clamp, one end of the fork or clamp being connected to the upright section and the other end of the fork or clamp being adapted to engage an artificial Christmas tree section to hold the same.

14. An artificial Christmas tree rolling storage cart as in claim 13, wherein at least some of said plurality of elements mount two or more wheels, said upright section has two tubular elements that may be moved relative to one another to change the height of the upright section and cart to accommodate different size artificial Christmas sections, said base and said plurality of tubular elements are "X" or cross shaped in a plane parallel to the ground, said upright section rises from the center of said "X" or cross shaped base.

15. An artificial Christmas tree rolling storage cart as in claim 9, wherein said upright section comprises at least one tubular element which is supported on each said base.

16. A method for using a rolling storage cart for storage of a multiple section artificial Christmas tree of an assembled height greater than six feet, the cart including a wheeled base supporting an upright section having a plurality of holding means thereon to which sections of the artificial Christmas tree are engageable for storage, comprising the steps of:
   a) rolling the storage cart into close proximity to the artificial Christmas tree to be dismantled;
   b) dismantling a first section of the artificial Christmas tree and engaging it to one of the holding means by inserting a portion of the section into the holding means;
   c) dismantling further sections of the artificial Christmas tree and engaging them within one of the plurality of holding means in like manner;
   d) repeating step c) until all the multiple sections of the artificial Christmas tree are stored on the cart;
   e) engaging a base of the artificial Christmas tree to the cart; and
   f) wheeling the cart to an area for storage of the artificial Christmas tree multiple sections tree.

17. A method for using a rolling storage cart for assembly of a multiple sections artificial Christmas tree of an assembled height greater than six feet as in claim 16, comprising the steps of:
   a) rolling the storage cart with the artificial Christmas tree sections thereon into close proximity to the position the artificial Christmas tree is to be assembled;
   b) disengaging the base of the artificial Christmas tree from the cart and positioning the base where the artificial Christmas tree is desired to be assembled;
   c) disengaging the bottom section of the artificial Christmas tree from the cart and placing the bottom section onto the base;
   d) disengaging further sections of the artificial Christmas tree, next to bottom to top, from one of the plurality of holding means;
   e) placing the further sections of the artificial Christmas tree on the sections previously assembled;
   f) repeating steps d) and e) until all sections of the multiple sections of the artificial Christmas tree are assembled; and
   g) wheeling the cart back to the storage area after all the parts are disengaged and assembled in the desired position to form the artificial Christmas tree.

18. A method for using a rolling storage cart for assembly of a multiple sections artificial Christmas tree of an assembled height greater than six feet, the cart including a wheeled base supporting an upright section having a plurality of holding means thereon to which multiple sections of the artificial Christmas tree sections and Christmas tree base are engaged, comprising the steps of:
   a) rolling the storage cart with the artificial Christmas tree sections and base thereon from a storage area into close proximity to the position the artificial Christmas tree is to be assembled;
   b) disengaging the base of the artificial Christmas tree from the cart; and positioning the base where the artificial Christmas tree is desired to be assembled;

c) disengaging the bottom section of the artificial Christmas tree from the cart and placing the bottom section onto the base;

d) disengaging further sections of the artificial Christmas tree, next to bottom to top, from one of the plurality of holding means;

e) placing the further sections of the artificial Christmas tree on the sections previously assembled;

f) repeating steps d) and e) until all sections of the multiple parts are assembled to form the complete artificial Christmas tree; and g) wheeling the cart back to a storage area after all the parts are disengaged and assembled in the desired position to form the artificial Christmas tree.

19. A method for using a rolling storage cart built from a packaged kit of storage cart for a multiple part artificial Christmas tree, for storage of a multiple section artificial Christmas tree of an assembled of a height greater than six feet, comprising the steps of:

a) rolling the built storage cart from a storage area into close proximity to the artificial Christmas tree to be dismantled;

b) dismantling a top section of the artificial Christmas tree and engaging it to one of the holding means by inserting a portion of the section into one of the holding means;

c) dismantling further sections of the artificial Christmas tree and engaging them within others of the plurality of holding means;

d) repeating step c) until all the multiple sections of the artificial Christmas tree are stored on the cart;

e) engaging a base of the artificial Christmas tree on the cart; and wheeling the cart to an area for storage of the artificial Christmas tree multiple sections tree.

20. A method for using a rolling storage cart built from a packaged kit of storage cart for a multiple part artificial Christmas tree for assembly of a multiple sections artificial Christmas tree of an assembled height greater than six feet, as in claim 19, comprising the steps of a) rolling the built storage cart with the artificial Christmas tree sections thereon from an area for storage into close proximity to the position the artificial Christmas tree is to be assembled;

b) disengaging the base of the artificial Christmas tree engaged to one of the holding means and c) positioning the base where the artificial Christmas tree is desired to be assembled;

d) disengaging the bottom section of the artificial Christmas tree from the cart and placing the bottom section onto the base;

e) disengaging further sections of the artificial Christmas tree, next to bottom to top, from one of the plurality of holding means;

f) placing the disengaged further section of the artificial Christmas tree onto the sections already assembled;

g) repeating steps e) and f) until all sections of the multiple sections are assembled to fully form the artificial Christmas tree; and h) wheeling the cart to a storage area after all the sections of the artificial Christmas tree are disengaged therefrom and assembled to form the artificial Christmas tree.

21. An artificial Christmas tree rolling cart as in claim 9, wherein said holding means is in the form of one of a fork or clamp, one end of the fork or clamp being connected to the upright section and the other end of the fork or clamp being adapted to engage an artificial Christmas tree section to hold the same.

22. An artificial Christmas tree rolling storage cart as in claim 21, wherein said base and said plurality of tubular elements are one of rectangular or square shaped in a plane parallel to the ground, said upright section rises from two of said base tubular elements which are opposite one another, further including an upper horizontal bar extending from adjacent the top of one upright section and across to the top of the other upright section, the base and upper horizontal bar is increased in length to accommodate further artificial Christmas tree sections, said tubular elements of said base are telescopically constructed and said upper horizontal bar is also telescopically constructed to permit their changes of length.

* * * * *

UNITED STATES PATENT AND TRADEMARK OFFICE
CERTIFICATE OF CORRECTION

| | | |
|---|---|---|
| PATENT NO. | : 8,801,004 B2 | Page 1 of 1 |
| APPLICATION NO. | : 13/200619 | |
| DATED | : August 12, 2014 | |
| INVENTOR(S) | : David R. Hickey | |

It is certified that error appears in the above-identified patent and that said Letters Patent is hereby corrected as shown below:

On the Title Page, item [57] Abstract, last line, "and for" should be "and/or"

In the Claims

Claim 19, Column 9, line 33, insert subparagraph as follows:
-- f) -- before "wheeling the cart to an area for storage of the artificial"

Signed and Sealed this
Fourth Day of November, 2014

Michelle K. Lee
*Deputy Director of the United States Patent and Trademark Office*